US012709789B2

(12) United States Patent
Saboo et al.

(10) Patent No.: US 12,709,789 B2
(45) Date of Patent: Aug. 18, 2026

(54) BULK METALLIC GLASS-BASED ALLOYS FOR ADDITIVE MANUFACTURING

(71) Applicants: QUESTEK INNOVATIONS LLC, Evanston, IL (US); QUESTEK EUROPE AB, Solna (SE)

(72) Inventors: Abhinav Saboo, Evanston, IL (US); Zaynab Mahbooba, Raleigh, NC (US); Ida Svensson Berglund, Chicago, IL (US); Martin Walbrühl, Solna (SE); Jiayi Yan, Sollentuna (SE)

(73) Assignees: QUESTEK INNOVATIONS LLC, Evanston, IL (US); QUESTEK EUROPE AB, Solna (SE)

( * ) Notice: Subject to any disclaimer, the term of this patent is extended or adjusted under 35 U.S.C. 154(b) by 514 days.

(21) Appl. No.: 16/881,292

(22) Filed: May 22, 2020

(65) Prior Publication Data

US 2021/0222275 A1 Jul. 22, 2021

Related U.S. Application Data

(60) Provisional application No. 62/851,261, filed on May 22, 2019.

(51) Int. Cl.
*C22C 38/02* (2006.01)
*B22F 1/05* (2022.01)
(Continued)

(52) U.S. Cl.
CPC ................ *C22C 38/02* (2013.01); *B22F 1/05* (2022.01); *B22F 1/08* (2022.01); *B22F 9/082* (2013.01);
(Continued)

(58) Field of Classification Search
None
See application file for complete search history.

(56) References Cited

U.S. PATENT DOCUMENTS 3,986,867 A * 10/1976 Masumoto .............. C22C 45/02 420/583
4,116,682 A * 9/1978 Polk ...................... C22C 45/008 420/439
(Continued)

FOREIGN PATENT DOCUMENTS

CN 105583401 A 5/2016
CN 108624827 A * 10/2018 ........... C22C 33/003
(Continued)

OTHER PUBLICATIONS

Naka et al. "Change in Corrosion Behavior of Amorphous Fe—P—C Alloys by Alloying with Various Metallic Elements." Journal of Non-Crystalline Solids 31 (1979) pp. 355-365. (Year: 1979).*
(Continued)

*Primary Examiner* — Humera N. Sheikh
(74) *Attorney, Agent, or Firm* — Michael Best & Friedrich LLP

(57) ABSTRACT

An alloy may include at least one first element, the first element being selected from: nickel (Ni), zirconium (Zr), cerium (Ce), molybdenum (Mo), aluminum (Al), tantalum (Ta), cobalt (Co), yttrium (Y), chromium (Cr), copper (Cu), and manganese (Mn); no more than three second elements, the second elements being selected from: phosphorous (P), carbon (C), boron (B), and silicon (Si); and the balance iron (Fe). Typically, a majority of a crystal structure of the alloy may be amorphous. In some instances, between 1 volume percent (vol. %) and 50 vol. % of the crystal structure may be a crystalline metal phase. The crystalline metal phase includes at least one of: copper (Cu), aluminum (Al),
(Continued)

vanadium (V), chromium (Cr), iron (Fe), cobalt (Co), nickel (Ni), and molybdenum (Mo).

10 Claims, 12 Drawing Sheets

(51) Int. Cl.

| | |
|---|---|
| ***B22F 1/08*** | (2022.01) |
| ***B22F 9/08*** | (2006.01) |
| ***B33Y 70/00*** | (2020.01) |
| ***C22C 38/00*** | (2006.01) |
| ***C22C 38/04*** | (2006.01) |
| ***C22C 38/06*** | (2006.01) |
| ***C22C 38/08*** | (2006.01) |
| ***C22C 38/12*** | (2006.01) |
| ***C22C 38/14*** | (2006.01) |
| ***C22C 38/22*** | (2006.01) |
| ***C22C 38/32*** | (2006.01) |
| ***C22C 45/00*** | (2023.01) |
| ***C22C 45/02*** | (2006.01) |
| ***C22C 45/04*** | (2006.01) |

(52) U.S. Cl.
CPC ............ *B33Y 70/00* (2014.12); *C22C 38/002* (2013.01); *C22C 38/005* (2013.01); *C22C 38/04* (2013.01); *C22C 38/06* (2013.01); *C22C 38/08* (2013.01); *C22C 38/12* (2013.01); *C22C 38/14* (2013.01); *C22C 38/22* (2013.01); *C22C 38/32* (2013.01); *C22C 45/001* (2013.01); *C22C 45/008* (2013.01); *C22C 45/02* (2013.01); *C22C 45/04* (2013.01); *B22F 2301/355* (2013.01)

(56) References Cited

U.S. PATENT DOCUMENTS

| | | | | |
|---|---|---|---|---|
| 4,255,189 | A * | 3/1981 | Ray ....................... | C22C 45/008 148/403 |
| 8,529,712 | B2 | 9/2013 | Demetriou et al. | |
| 2006/0283527 | A1* | 12/2006 | Poon ....................... | C22C 45/02 148/403 |
| 2007/0175545 | A1* | 8/2007 | Urata .................. | H01F 41/0226 148/304 |
| 2009/0101244 | A1* | 4/2009 | Ogawa .................... | C22C 45/02 148/403 |
| 2010/0300148 | A1* | 12/2010 | Demetriou ............. | C22C 45/02 63/3 |
| 2011/0048587 | A1* | 3/2011 | Vecchio ................... | C21D 1/26 148/403 |
| 2012/0073710 | A1* | 3/2012 | Kim ...................... | C22C 38/002 148/548 |
| 2014/0076467 | A1* | 3/2014 | Na .......................... | C22C 45/04 420/443 |
| 2014/0190593 | A1* | 7/2014 | Na ............................ | C22C 1/11 420/98 |
| 2015/0176111 | A1* | 6/2015 | Na ............................ | C22C 1/11 148/403 |
| 2018/0339338 | A1 | 11/2018 | Hofmann et al. | |
| 2018/0345366 | A1 | 12/2018 | Hofmann | |

FOREIGN PATENT DOCUMENTS

| | | | | |
|---|---|---|---|---|
| CN | 109440022 | A | * 3/2019 | |
| GB | 1525276 | A | * 9/1978 | ............. C22C 19/00 |
| JP | 58199839 | A | * 11/1983 | |
| JP | 63312965 | A | * 12/1988 | |
| JP | 2009270152 | A | * 11/2009 | |
| WO | 2012047651 | A2 | 4/2012 | |

OTHER PUBLICATIONS

Jia et al. "Synthesis and properties of ferromagnetic Fe-based (Fe, Ni, Co)—Mo—P—C—B bulk metallic glasses with large super-cooled liquid region." Physica B 470-471 (2015). pp. 107-112. (Year: 2015).*

English language machine translation of JP2009270152A. Generated Mar. 30, 2024. (Year: 2024).*

English language machine translation of JP-58199839-A. Generated Dec. 20, 2024. (Year: 2024).*

Swedish Patent and Registration Office action and Search Report for Application No. 2050597-0 dated Dec. 16, 2020 (10 pages).

Zhang et al., "3D priting of Fe-based bulk metallic glasses and composite with large dimensions and enhanced toughness by thermal spraying", Journal of Materials Chemistry A, vol. 6, 2018, pp. 6800-6805.

Cardinal et al., "Improvement of Plasticity of Bulk Metallic Glassed by Addition of a Crystalline Phase: Manufacturing of CuZrAl Composites by Spark Plasma Sintering," presented at the World Congress on Powder Metallurgy 2018 in Beijing, China, pp. 348-354.

Greer et al., "Shear bands in metallic glasses," Materials Science and Engineering R, 2013, 74 (4): 71-132.

Lewandowski et al., "Intrinsic plasticity or brittleness of metallic glasses," Philosophical Magazine Letters, 2005, 85(2): 77-87.

Li et al., "3D printing of Fe-based bulk metallic glass composites with combined high strength and fracture toughness," Materials and Design, Apr. 2018, 143, pp. 285-296.

Pelletier et al., "Features of Interfaces in a Metallic Glass Matrix Composite Obtained by Densification of Amorphous Powders," presented at the World Congress on Powder Metallurgy 2018 in Beijing, China pp. 436-441.

Thermo-Calc Software, "TCFE9: Steels/Fe-alloys Database," Jun. 2017, 44 pages.

Ward et al., "A general-purpose machine learning framework for predicting properties of inorganic materials," npj Computational Materials, Feb. 2016, Article No. 16028.

Xi et al., "Fracture of Brittle Metallic Glasses: Brittleness or Plasticity," Phys. Rew. Lett., 2005, 94(12): 125510.

* cited by examiner

Amorphous after printing (experimentally)

Fe-0.1325P-0.,195Ni 0.6265Fe-0.1325P-0.046Zr-0.195Ni 0.659-0.13-0.024-0.06Mn-0.057Mo-0.071Ni 0.77Fe-0.11P-0Zr-0.12Ce 0.67Fe-0.11P-0.04Zr-0.05Ce-0.13Al

604

0.61Fe-0.11P-0.09Zr-0.19Al 0.64Fe-0.11P-0.02Zr-0.23Y 0.76Fe-0.11P-0.01Zr-0.12Mo

Crystallized after printing (experimentally)

602

Trg 0.4 0.45 0.5 0.55

0 50 100 150 200 250 300

Critical defect size [micrometers]

BULK METALLIC GLASS-BASED ALLOYS FOR ADDITIVE MANUFACTURING

CROSS REFERENCE TO RELATED APPLICATIONS

The present application is related to and claims the priority benefit of U.S. Provisional Patent Application No. 62/851,261, filed on May 22, 2019, the entire contents of which are hereby incorporated by reference.

TECHNICAL FIELD

The present disclosure relates to materials, methods and techniques for manufacturing iron-based alloys. More particularly, the iron-based alloys are bulk metallic glasses particularly suited for additive manufacturing.

INTRODUCTION

Additive manufacturing, also known as 3-D printing, is a fabrication technique that utilizes successive layer generation to produce an item of manufacture. Typically, additive manufacturing methods use powders, wires, or liquid bases to generate layers under direction of computer-aided design data. Example additive manufacturing processes include selective laser sintering (SLS), electron beam melting (EBM), and laser powder deposition (LPD).

By allowing for net-shape fabrication of highly complex geometries without molds or machining, this process offers the potential to reduce material usage, energy consumption, component cost, and fabrication time. Additive manufacturing allows for rapid component production, one-off production of difficult-to-source parts, and production of parts difficult to produce by conventional means (such as complex geometries that cannot be machined or cast). As a result, additive manufacturing can provide flexibility in part manufacturing to original equipment manufacturers as well as end users acquiring custom or replacement parts.

SUMMARY

Materials, methods and techniques disclosed and contemplated herein relate to iron-based bulk metallic glasses. In one aspect, an alloy is disclosed. The alloy may include at least one first element, the first element being selected from: nickel (Ni), zirconium (Zr), cerium (Ce), molybdenum (Mo), aluminum (Al), tantalum (Ta), cobalt (Co), yttrium (Y), chromium (Cr), copper (Cu), and manganese (Mn); no more than three second elements, the second elements being selected from: phosphorous (P), carbon (C), boron (B), and silicon (Si); and the balance iron (Fe). A majority of a crystal structure of the alloy may be amorphous and the alloy may have a critical defect size, $a_c$, of between 100 μm and 300 μm.

In another aspect, an alloy is disclosed. The alloy may include at least one first element, the first element being selected from: nickel (Ni), zirconium (Zr), cerium (Ce), molybdenum (Mo), aluminum (Al), tantalum (Ta), cobalt (Co), yttrium (Y), chromium (Cr), copper (Cu), and manganese (Mn); no more than three second elements, the second elements being selected from: phosphorous (P), carbon (C), boron (B), and silicon (Si); and the balance iron (Fe). A majority of a crystal structure of the alloy may be amorphous and between 1 volume percent (vol. %) and 50 vol. % of the crystal structure may be a crystalline metal phase. The crystalline metal phase includes at least one of: copper (Cu), aluminum (Al), vanadium (V), chromium (Cr), iron (Fe), cobalt (Co), nickel (Ni), and molybdenum (Mo).

In another aspect, an alloy powder for additive manufacturing is disclosed. The atomized alloy powder includes alloy particles that can include at least one first element, the first element being selected from: nickel (Ni), zirconium (Zr), cerium (Ce), molybdenum (Mo), aluminum (Al), tantalum (Ta), cobalt (Co), yttrium (Y), chromium (Cr), copper (Cu), and manganese (Mn); no more than three second elements, the second elements being selected from: phosphorous (P), carbon (C), boron (B), and silicon (Si); and the balance iron (Fe). A majority of a crystal structure of the alloy may be amorphous after being subjected to an additive manufacturing process.

There is no specific requirement that a material, technique or method relating to iron-based bulk metallic glass alloys include all of the details characterized herein, in order to obtain some benefit according to the present disclosure. Thus, the specific examples characterized herein are meant to be exemplary applications of the techniques described, and alternatives are possible.

DETAILED DESCRIPTION

Figure 1:
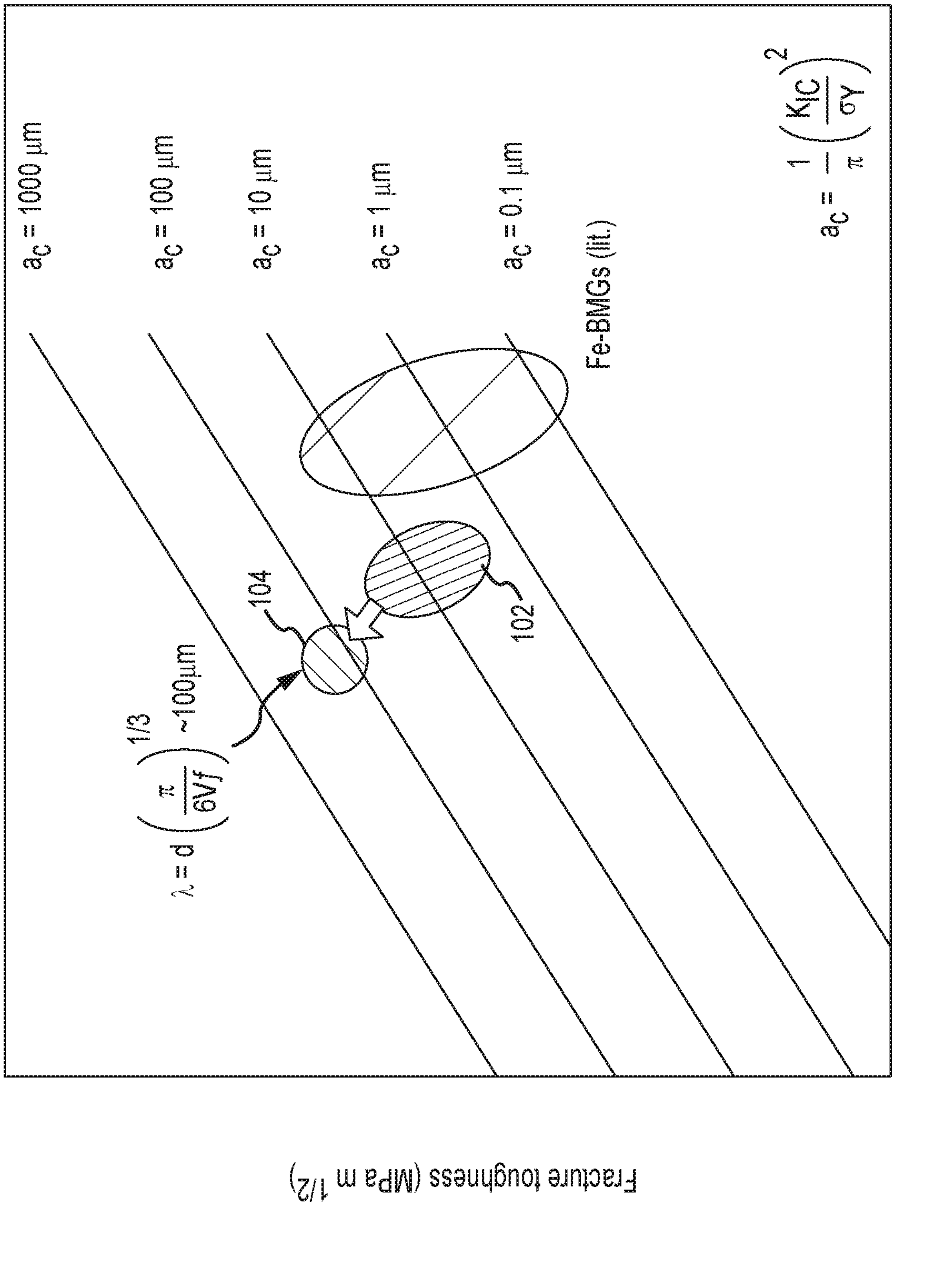
FIG. 1 shows a chart of fracture toughness versus yield strength for iron-based bulk metallic glass alloys and bulk metallic glass composites with additional improvement in toughness.

Materials, methods and techniques disclosed and contemplated herein relate to iron-based alloys. Example alloys can be ternary base systems with one or more additional elements. Example alloys typically have a majority amorphous crystal structure.

Alloys disclosed and contemplated herein are well suited for additive manufacturing applications. For instance, an atomized alloy powder usable in additive manufacturing can include alloy particles comprising iron-based alloys disclosed and contemplated herein. Additive manufacturing (AM) gives a unique capability to manufacture bulk metallic glasses (BMGs) as the layer-by-layer processing route not only provides high cooling rates necessary to suppress crystallization, but also allows geometries of any shape and thickness to be produced. AM approaches thus enable production of material significantly larger than the current critical casting thickness, but still amorphous.

Metallic glasses exhibit unique and desirable characteristics that are not achievable using conventional alloys. Currently available bulk metallic glasses are not of significant industrial relevance due to manufacturing limitations. To create bulk metallic glasses, rapid cooling is required to suppress transformation into a crystalline structure during solidification. Conventional manufacturing processes provide inadequate cooling rates throughout the melt/cast, leaving bulk metallic glass-suitable processes limited to thin components.

Thus far, research regarding the additive manufacturing of Fe-based metallic glass has focused on laser powder bed processes. While the technology has progressed, researchers report challenges overcoming devitrification and cracking during processing, both of which are detrimental to the mechanical and magnetic performance of the material. Many previously studied compositions have not been shown to be AM processable and exhibited poor mechanical performance due to process-induced cracks.

The instant disclosure is directed to glass forming alloys with crack resistance, glass forming ability (GFA), and/or thermal stability while maintaining suitable properties for additive processing to ensure crack free, or substantially crack free, alloys. Mechanical and physical properties of metallic glass are interconnected. Typically, as the toughness increases, the glass forming ability decreases; therefore, exemplary alloys disclosed and contemplated herein are directed to achieving an appropriate balance of toughness and glass forming ability for high AM processability.

For glass forming ability, several metrics are described in the literature based on a combination of thermodynamic attributes like glass transition temperature, liquidus temperature, crystallization temperature, etc. Some of these thermodynamic quantities may be calculated using CALPHAD (CALculation of PHase Diagram)-based computational tools such as the commercially-available Thermo-Calc software. Thermo-Calc software with the TCFE9 commercial database was used to determine the liquidus temperature and also which crystalline phases are likely to form on solidification, both of which are important measures of GFA.

Glasses are prone to cracking, and the stresses and defects arising from the AM process can be significant. AM process-induced cracking can be prevented by a matrix that can tolerate the defects and stresses. The higher the ductility of the glass, the better the defect tolerance. Bulk modulus (B) and shear modulus (μ) can provide a useful measure of toughness, which relates directly to crack resistance. In addition, these values were used to calculate the Poisson's ratio and hardness, also critical properties for glass alloy performance.

Interstitial elements such as carbon C, boron B, and phosphorous P can improve the glass forming ability of bulk metallic glass alloys. Improved glass forming ability can be attributable to larger atomic size mismatches between these elements and metal elements such as Fe, Ni, and Zr. Improved glass forming ability can be attributable to formation of molecular associates in the liquid like Ma(P, B, C)b, where M is the metal element and values of a and b depend on the elements and glass formers used.

I. Exemplary Iron-Based Alloys

Generally, alloys disclosed and contemplated herein can be processable via additive manufacturing (AM) and typically have glassy structures. Compositions disclosed and contemplated herein also can demonstrate a combination of toughness and glass formability. Compositions disclosed herein can be alloys in the form of an atomized powder. Exemplary atomized powders can be used to produce an article via additive manufacturing.

Broadly, alloys disclosed and contemplated herein can be described as bulk metallic glass alloys or as bulk metallic glass composite alloys. Generally, bulk metallic glass composite alloys, as used herein, include bulk metallic glass and an additional metal phase. As discussed below in greater detail, the additional metal phase can be provided (before additive manufacturing is performed) as a coating on bulk metallic glass powder particles (as with copper) or as pure metal powder particles mixed with bulk metallic glass powder.

A. Components and Amounts of Exemplary Bulk Metallic Glass Alloys

Exemplary bulk metallic glass alloys include a majority iron (Fe) and additional components. Exemplary bulk metallic glass alloys can include, in addition to iron, two or more of the following first elements: nickel (Ni), zirconium (Zr), cerium (Ce), molybdenum (Mo), aluminum (Al), tantalum (Ta), cobalt (Co), yttrium (Y), chromium (Cr), copper (Cu), and manganese (Mn). For instance, exemplary bulk metallic glass alloys may include, without limitation, the following first elements: Zr and Ni; Zr and Al; Mo and Ni; Zr and Ce; Zr and Mo; Zr and Y; Al and Y; Cr and Mo; Zr and Co; Zr and Y; Ni and Ta; Mo and Al; Cu and Ni; Zr, Ce, and Al; Mn, Ni, and Al; Mo, Ni and Al; Mn, Mo, and Ni; Cr, Mo, and Al; Cr, Mo, Ni and Al; Co, Cr, Mo, and Al; Ce, Cr, Mo, and Al. Other combinations are contemplated.

Exemplary bulk metallic glass alloys may include, when present, between 6.0 atomic percent (at %) and 40.0 at % nickel (Ni). In various implementations, exemplary bulk metallic glass alloys may include between: 6 at % and 40 at % Ni; 6 at % and 20 at % Ni; 20 at % and 40 at % Ni; 6 at % and 11 at % Ni; 11 at % and 16 at % Ni; 16 at % and 21 at % Ni; 21 at % and 26 at % Ni; 26 at % and 31 at % Ni; 31 at % and 36 at % Ni; 36 at % and 40 at % Ni; 18 at % and 22 at % Ni; or 19 at % and 21 at % Ni.

Exemplary bulk metallic glass alloys may include, when present, between 1.0 at % and 14.0 at % zirconium (Zr). In various implementations, exemplary bulk metallic glass alloys may include between: 1 at % and 14 at % Zr; 1 at % and 7 at % Zr; 7 at % and 14 at % Zr; 1 at % and 4 at % Zr; 4 at % and 7 at % Zr; 7 at % and 10 at % Zr; 10 at % and 13 at % Zr; 2 at % and 4 at % Zr; 4 at % and 6 at % Zr; 6 at % and 8 at % Zr; 8 at % and 10 at % Zr; 10 at % and 12 at % Zr; or 12 at % and 14 at % Zr.

Exemplary bulk metallic glass alloys may include, when present, between 5.0 at % and 12.0 at % cerium (Ce). In various implementations, exemplary bulk metallic glass alloys may include between: 5 at % and 12 at % Ce; 5 at % and 8 at % Ce; 8 at % and 12 at % Ce; 5 at % and 7 at % Ce; 7 at % and 9 at % Ce; 9 at % and 11 at % Ce; or 10 at % and 12 at % Ce.

Exemplary bulk metallic glass alloys may include, when present, between 0.40 at % and 14.0 at % molybdenum (Mo). In various implementations, exemplary bulk metallic glass alloys may include between: 0.4 at % and 14 at % Mo; 0.4 at % and 7 at % Mo; 7 at % and 14 at % Mo; 0.4 at % and 4 at % Mo; 4 at % and 7 at % Mo; 7 at % and 10 at % Mo; or 10 at % and 14 at % Mo.

Exemplary bulk metallic glass alloys may include, when present, between 0.30 at % and 15.0 at % aluminum (Al). In various implementations, exemplary bulk metallic glass alloys may include between: 0.3 at % and 15 at % Al; 0.3 at % and 6 at % Al; 6 at % and 11 at % Al; 10 at % and 15 at % Al; 0.3 at % and 4 at % Al; 4 at % and 7 at % Al; 7 at % and 10 at % Al; 10 at % and 13 at % Al; or 12 at % and 15 at % Al.

Exemplary bulk metallic glass alloys may include, when present, 1.0 at % and 15.0 at % tantalum (Ta). In various implementations, exemplary bulk metallic glass alloys may include between: 1 at % and 15 at % Ta; 1 at % and 7 at % Ta; 7 at % and 15 at % Ta; 1 at % and 4 at % Ta; 4 at % and 7 at % Ta; 7 at % and 10 at % Ta; 10 at % and 15 at % Ta; 2 at % and 4 at % Ta; 4 at % and 6 at % Ta; 6 at % and 8 at % Ta; 8 at % and 10 at % Ta; 10 at % and 12 at % Ta; or 12 at % and 15 at % Ta.

Exemplary bulk metallic glass alloys may include, when present, between 1.0 at % and 7.0 at % cobalt (Co). In various implementations, exemplary bulk metallic glass alloys may include between: 1 at % and 7 at % Co; 1 at % and 4 at % Co; 3 at % and 7 at % Co; 1 at % and 3 at % Co; 3 at % and 5 at % Co; or 5 at % and 7 at % Co.

Exemplary bulk metallic glass alloys may include, when present, between 0.1 at % and 10.0% or between 23.0 at % and 25.0 at % yttrium (Y). In some instances, yttrium (Y) may be present between 0.1 at % and 10.0 at % for possible oxygen gettering. In various implementations exemplary bulk metallic glass alloys may include between: 0.1 at % and 10 at % Y; 1 at % and 5 at % Y; 5 at % and 10 at % Y; 2 at % to 8 at % Y; 1 at % to 3 at % Y; 3 at % to 6 at % Y; 6 at % to 9 at % Y; 23 at % to 25 at % Y; 23.5 at % to 24.5 at % Y; 23 at % to 24 at % Y; or 24 at % to 25 at % Y.

Exemplary bulk metallic glass alloys may include, when present, between 3.0 at % and 11.0 at % manganese (Mn). In various implementations, exemplary bulk metallic glass alloys may include between: 3 at % and 11 at % Mn; 3 at % and 7 at % Mn; 7 at % and 11 at % Mn; 3 at % and 5 at %; 5 at % and 7 at % Mn; 7 at % and 9 at % Mn; or 9 at % and 11 at % Mn.

Exemplary bulk metallic glass alloys can also include one or more second elements, where second elements are typically glass forming components. Exemplary second elements include phosphorous (P), carbon (C), boron (B), and silicon (Si). As examples, exemplary bulk metallic glass alloys may include, without limitation, the following glass forming components: P; C and B; P and C; P, B, and C; or Si, B and C.

Exemplary bulk metallic glass alloys may include, when present, between 7.0 at % and 40.0 at % phosphorous (P). In various implementations, exemplary bulk metallic glass alloys may include between: 7 at % and 40 at % P; 7 at % P to 20 at % P; 20 at % to 40 at % P; 7 at % to 12 at % P; 12 at % to 17 at % P; 17 at % to 22 at % P; 22 at % to 27 at % P; 27 at % to 32 at % P; 32 at % to 37 at % P; 35 at % to 40 at % P; 7 at % to 10 at % P; 10 at % to 13 at % P; 13 at % to 16 at % P; or 16 at % to 20 at % P.

Exemplary bulk metallic glass alloys may include, when present, between 0.50 at % and 15.0 at % carbon (C). In various implementations, exemplary bulk metallic glass alloys may include between: 0.5 at % and 7 at % C; 7 at % and 15 at % C; 0.5 at % and 4 at % C; 4 at % and 7 at % C; 7 at % and 10 at % C; 10 at % and 13 at % C; 12 at % and 15 at % C; 0.5 at % and 1.0 at % C; 1 at % and 3 at % C; 3 at % and 5 at % C; 5 at % and 7 at % C; 7 at % and 9 at % C; 9 at % and 11 at % C; 11 at % and 13 at % C; or 13 at % and 15 at % C.

Exemplary bulk metallic glass alloys may include, when present, between 0.1 at % and 11.0 at % boron (B). In various implementations, exemplary bulk metallic glass alloys may include between: 0.1 at % and 6 at % B; 6 at % and 11 at % B; 0.1 at % and 1.0 at % B; 0.1 at % and 3 at % B; 3 at % and 5 at % B; 5 at % and 7 at % B; 7 at % and 9 at % B; or 9 at % and 11 at % B.

Exemplary bulk metallic glass alloys may include, when present, between 10.0 at % and 12.0 at % silicon (Si). In various implementations, exemplary bulk metallic glass alloys may include between: 10 at % and 12 at % Si; 10 at % and 11 at % Si; 11 at % and 12 at % Si; or 10.5 at % and 11.5 at % Si.

B. Design Approach for Exemplary Bulk Metallic Glass Alloys and Exemplary Bulk Metallic Glass Composite Alloys A design approach for exemplary bulk metallic glass composite alloys (also referred to as dual phase composite systems) is illustrated in FIG. 1. Fe-based bulk metallic glass alloys (102) are designed for an improved fracture toughness $K_{1C}$ (and fracture energy G) at the expense of $\sigma_Y$. The critical defect tolerance $a_c$ will increase, thus making the designed bulk metallic glass alloys less susceptible to micro-cracking, induced by the thermal cycling and the associated local stress concentrations during the AM process.

To further increase the defect tolerance, exploiting the aforementioned benefits on toughness, a second phase may be introduced into the bulk metallic glass matrix. The volume fraction $V_f$ of the introduced second phase can reduce the bulk metallic glass composite alloy strength while increasing the fracture toughness beyond that of a pure Fe-based bulk metallic glass alloy (104). Designing effective composite properties in terms of $K_{1C}$ and $\sigma_Y$ is done in accordance with the calculated mean particle spacing $\lambda$ to follow the aforementioned design criterion of $\lambda \leq a_c$.

Figure 2:
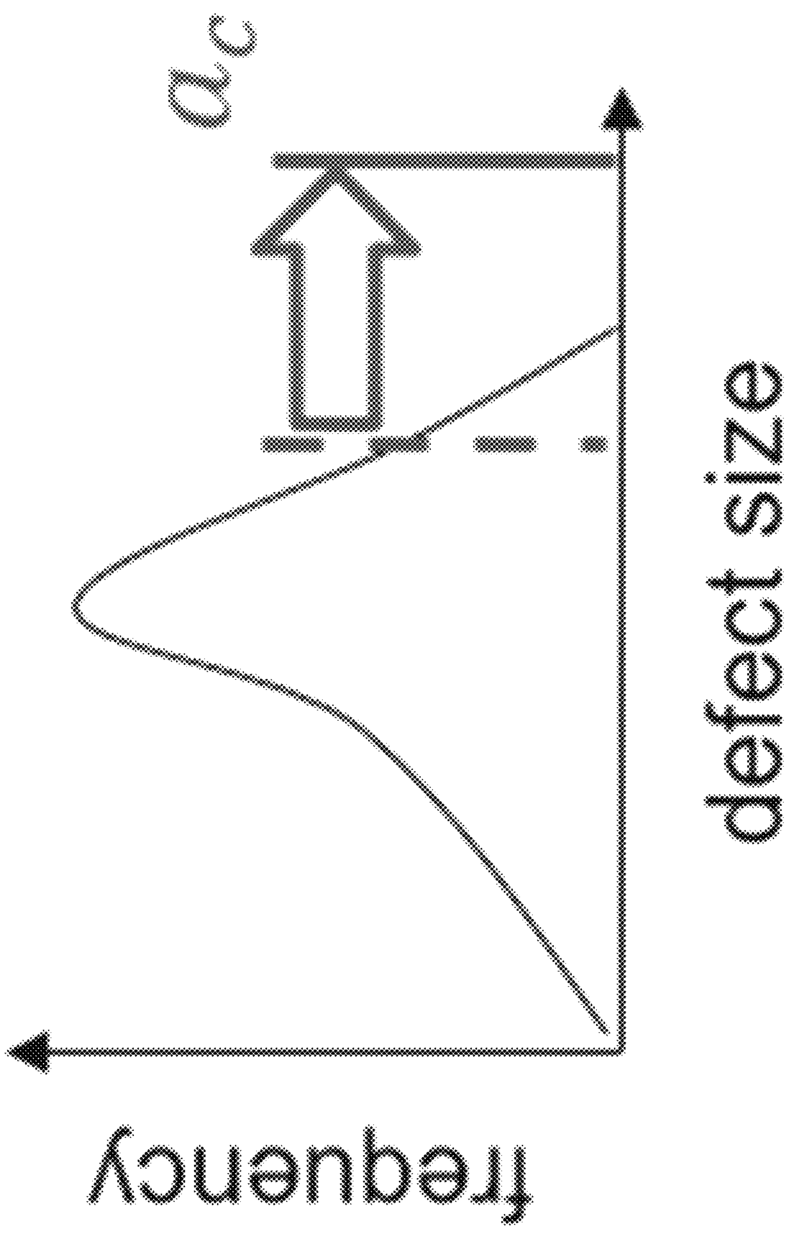
FIG. 2 shows a chart of increased critical defect size, $a_c$, as measure for improved defect tolerance.

As mentioned above, micro-cracking can be a severe issue for intrinsically brittle Fe-based bulk metallic glass systems, leading to limited printability in additive manufacturing. Investigating an Fe-based bulk metallic glass system indicates that the micro-cracking may have its origin in the thermal cycling within the melt pool and HAZ (Heat Affected Zone) and lead to local peaks of stress concentration, exceeding the BMG's fracture strength, in vicinity of defects such as micro-porosity introduced during the AM process. Premature brittle fracture takes place if a considerable amount of defects are larger than the critical size defined by fracture toughness and yield strength. Increasing defect tolerance, namely the critical defect size, can be important to enhance printability as illustrated schematically in FIG. 2.

Dual phase Fe-based bulk metallic glass composites alloys have been successfully produced via AM (see below) showing a potential to be used as design strategy reducing micro-cracking within AM produced bulk metallic glass alloys. Composite structures combine properties of two unlike phases, such as a brittle amorphous and tough metallic phase, creating unique property combinations that neither of the individual phases can achieve individually.

Deformation in bulk metallic glass composite alloy systems has been described as follows, emphasizing the beneficial effect on toughness improvement. Elastic deformation of both the bulk metallic glass and crystalline phase where, in the regime of low metal additions, the high composite yield strength comes from the intrinsically high yield strength of the matrix phase (bulk metallic glass). Under increasing stress, plastic deformation can occur in the crystalline phase via dislocation slip, mitigating the deformation energy within the composite. In case of AM, this release of deformation energy can therefore reduce the stresses associated with thermal cycling making the composite more resilient against micro-cracking. The dislocation density will increase upon further deformation until a critical stress value is reached. In the next stage, the stress may be transferred over the interfaces into the bulk metallic glass phase where shear bands form close to the interfaces. In a final step, the shear bands propagate in the bulk metallic glass matrix and leads to the final rupture of the composite.

In the absence of classical work hardening behavior, due to the lack of dislocations, shear band nucleation and propagation are expected to be the underlying mechanism describing the deformation behavior in amorphous systems. Hence the shear band propagation may be effectively hindered by the addition of a second phase of the formed composite, increasing the local resistance against micro-cracking.

In order to keep various favorable properties associated with the bulk metallic glass phase, it may be important to design the trade-off between the gain in plastic behavior (to withstand the local stress concentrations during thermal cycling) versus the reduction in strength associated with increasing volume fraction of the metallic phase. Aspects of the disclosed design concepts focus on these trade-offs, which can involve modeling of the process-structure-property-performance linkages in such composite systems.

Designing the bulk metallic glass alloy properties, the fracture toughness $K_{1C}$ and yield strength $\sigma_Y$ define the plastic zone $$R_p = 0.025\left(\frac{K_{IC}}{\sigma_Y}\right)^2$$

which is associated with the volume in front of the crack tip and can be used to describe the mitigation of stress concentrations from the crack allowing for plastic flow and hence absorption of the deformation energy. One additional approach is to look at the critical defect size $$\alpha_c = \frac{1}{\pi}\left(\frac{K_{IC}}{\sigma_Y}\right)^2$$

according to Griffith's description of the ideal linear-elastic fracture behavior and set the increase of defect tolerance as a design goal. In either way, the material system's ability for plasticity and defect resistance is calculated and can be used as design metric.

Focusing on the secondary phase in bulk metallic glass composite alloys, large mismatches in moduli and strength may promote the formation of additional shear bands and an intrinsically tough second phase (for example FCC) may lead to improved crack shielding. Matching thermal expansion coefficients between the bulk metallic glass matrix and second phase should limit the thermal stresses during the thermal cycling. The gain in toughness will be controlled by the intrinsic properties, size, distribution and fraction of the second phase and determine its ability to absorb deformation energy and prevent the cracking triggered by stress concentrations during the thermal cycling in the melt pool/HAZ regions. Regarding the latter three points, which might be summarized under mean particle spacing $$\lambda = d\left(\frac{\pi}{6V_f}\right)^{\frac{1}{3}}$$

where d is particle size and $V_f$ the fraction of the second phase, it can be important to design $\lambda \leq R_p$ to effectively hinder the shear band propagation or $\lambda \leq a_c$ to improve the defect tolerance accordingly.

The plastic zone $R_p$ and critical defect size $a_c$ of the composite can be designed consequently when introducing a secondary metallic phase that will change both the effective $K_{1C}$ (and fracture energy G) and $\sigma_Y$ of the composite. The change in properties may be modelled using effective property models such as Voigt average or even tighter bounds like Hashin-Shtrikman if required, as functions of second-phase volume fraction $V_f$.

C. Components and Amounts of Exemplary Bulk Metallic Glass Composite Alloys

In some instances, exemplary bulk metallic glass alloys disclosed herein can additionally include one or more crystalline metal phase components after being subjected to an additive manufacturing process. A combination of the bulk metallic glass phase and the crystalline metal phase is termed "bulk metallic glass composite alloys." Metal phases in exemplary bulk metallic glass composite alloys may include one or more of: copper (Cu), aluminum (Al), vanadium (V), chromium (Cr), iron (Fe), cobalt (Co), nickel (Ni), and molybdenum (Mo).

Exemplary bulk metallic glass composite alloys may include, when present, between 1.0 volumetric percent (vol. %) and 50.0 vol. % copper (Cu) after being subjected to an additive manufacturing process. In various implementations, bulk metallic glass composite alloys may include between: 1 vol. % and 50 vol. % Cu; 1 vol. % and 25 vol. % Cu; 25 vol. % and 50 vol. % Cu; 1 vol. % and 10 vol. % Cu; 10 vol. % and 20 vol. % Cu; 20 vol. % and 30 vol. % Cu; 30 vol. % and 40 vol. % Cu; 40 vol. % and 50 vol. % Cu; 1 vol. % and 5 vol. % Cu; 5 vol. % and 10 vol. % Cu; 10 vol. % and 15 vol. % Cu; 15 vol. % and 20 vol. % Cu; 20 vol. % and 25 vol. % Cu; 25 vol. % and 30 vol. % Cu; 30 vol. % and 35 vol. % Cu; 35 vol. % and 40 vol. % Cu; 40 vol. % and 45 vol. % Cu; or 45 vol. % and 50 vol. % Cu.

Exemplary bulk metallic glass composite alloys may include, when present, between 1.0 volumetric percent (vol. %) and 50.0 vol. % aluminum (Al) after being subjected to an additive manufacturing process. In various implementations, bulk metallic glass composite alloys may include between: 1 vol. % and 50 vol. % Al; 1 vol. % and 25 vol. % Al; 25 vol. % and 50 vol. % Al; 1 vol. % and 10 vol. % Al; 10 vol. % and 20 vol. % Al; 20 vol. % and 30 vol. % Al; 30 vol. % and 40 vol. % Al; 40 vol. % and 50 vol. % Al; 1 vol. % and 5 vol. % Al; 5 vol. % and 10 vol. % Al; 10 vol. % and 15 vol. % Al; 15 vol. % and 20 vol. % Al; 20 vol. % and 25 vol. % Al; 25 vol. % and 30 vol. % Al; 30 vol. % and 35 vol. % Al; 35 vol. % and 40 vol. % Al; 40 vol. % and 45 vol. % Al; or 45 vol. % and 50 vol. % Al.

Exemplary bulk metallic glass composite alloys may include, when present, between 1.0 volumetric percent (vol. %) and 50.0 vol. % vanadium (V) after being subjected to an additive manufacturing process. In various implementations, bulk metallic glass composite alloys may include between: 1 vol. % and 50 vol. % V; 1 vol. % and 25 vol. % V; 25 vol. % and 50 vol. % V; 1 vol. % and 10 vol. % V; 10 vol. % and 20 vol. % V; 20 vol. % and 30 vol. % V; 30 vol. % and 40 vol. % V; 40 vol. % and 50 vol. % V; 1 vol. % and 5 vol. % V; 5 vol. % and 10 vol. % V; 10 vol. % and 15 vol. % V; 15 vol. % and 20 vol. % V; 20 vol. % and 25 vol. % V; 25 vol. % and 30 vol. % V; 30 vol. % and 35 vol. % V; 35 vol. % and 40 vol. % V; 40 vol. % and 45 vol. % V; or 45 vol. % and 50 vol. % V.

Exemplary bulk metallic glass composite alloys may include, when present, between 1.0 volumetric percent (vol. %) and 50.0 vol. % chromium (Cr) after being subjected to an additive manufacturing process. In various implementations, bulk metallic glass composite alloys may include between: 1 vol. % and 50 vol. % Cr; 1 vol. % and 25 vol. % Cr; 25 vol. % and 50 vol. % Cr; 1 vol. % and 10 vol. % Cr; 10 vol. % and 20 vol. % Cr; 20 vol. % and 30 vol. % Cr; 30 vol. % and 40 vol. % Cr; 40 vol. % and 50 vol. % Cr; 1 vol. % and 5 vol. % Cr; 5 vol. % and 10 vol. % Cr; 10 vol. % and 15 vol. % Cr; 15 vol. % and 20 vol. % Cr; 20 vol. % and 25 vol. % Cr; 25 vol. % and 30 vol. % Cr; 30 vol. % and 35 vol. % Cr; 35 vol. % and 40 vol. % Cr; 40 vol. % and 45 vol. % Cr; or 45 vol. % and 50 vol. % Cr.

Exemplary bulk metallic glass composite alloys may include, when present, between 1.0 volumetric percent (vol. %) and 50.0 vol. % iron (Fe) after being subjected to an additive manufacturing process. In various implementations, bulk metallic glass composite alloys may include between: 1 vol. % and 50 vol. % Fe; 1 vol. % and 25 vol. % Fe; 25 vol. % and 50 vol. % Fe; 1 vol. % and 10 vol. % Fe; 10 vol. % and 20 vol. % Fe; 20 vol. % and 30 vol. % Fe; 30 vol. % and 40 vol. % Fe; 40 vol. % and 50 vol. % Fe; 1 vol. % and 5 vol. % Fe; 5 vol. % and 10 vol. % Fe; 10 vol. % and 15 vol. % Fe; 15 vol. % and 20 vol. % Fe; 20 vol. % and 25 vol. % Fe; 25 vol. % and 30 vol. % Fe; 30 vol. % and 35 vol. % Fe; 35 vol. % and 40 vol. % Fe; 40 vol. % and 45 vol. % Fe; or 45 vol. % and 50 vol. % Fe.

Exemplary bulk metallic glass composite alloys may include, when present, between 1.0 volumetric percent (vol. %) and 50.0 vol. % cobalt (Co) after being subjected to an additive manufacturing process. In various implementations, bulk metallic glass composite alloys may include between: 1 vol. % and 50 vol. % Co; 1 vol. % and 25 vol. % Co; 25 vol. % and 50 vol. % Co; 1 vol. % and 10 vol. % Co; 10 vol. % and 20 vol. % Co; 20 vol. % and 30 vol. % Co; 30 vol. % and 40 vol. % Co; 40 vol. % and 50 vol. % Co; 1 vol. % and 5 vol. % Co; 5 vol. % and 10 vol. % Co; 10 vol. % and 15 vol. % Co; 15 vol. % and 20 vol. % Co; 20 vol. % and 25 vol. % Co; 25 vol. % and 30 vol. % Co; 30 vol. % and 35 vol. % Co; 35 vol. % and 40 vol. % Co; 40 vol. % and 45 vol. % Co; or 45 vol. % and 50 vol. % Co.

Exemplary bulk metallic glass composite alloys may include, when present, between 1.0 volumetric percent (vol. %) and 50.0 vol. % nickel (Ni) after being subjected to an additive manufacturing process. In various implementations, bulk metallic glass composite alloys may include between: 1 vol. % and 50 vol. % Ni; 1 vol. % and 25 vol. % Ni; 25 vol. % and 50 vol. % Ni; 1 vol. % and 10 vol. % Ni; 10 vol. % and 20 vol. % Ni; 20 vol. % and 30 vol. % Ni; 30 vol. % and 40 vol. % Ni; 40 vol. % and 50 vol. % Ni; 1 vol. % and 5 vol. % Ni; 5 vol. % and 10 vol. % Ni; 10 vol. % and 15 vol. % Ni; 15 vol. % and 20 vol. % Ni; 20 vol. % and 25 vol. % Ni; 25 vol. % and 30 vol. % Ni; 30 vol. % and 35 vol. % Ni; 35 vol. % and 40 vol. % Ni; 40 vol. % and 45 vol. % Ni; or 45 vol. % and 50 vol. % Ni.

Exemplary bulk metallic glass composite alloys may include, when present, between 1.0 volumetric percent (vol. %) and 50.0 vol. % molybdenum (Mo) after being subjected to an additive manufacturing process. In various implementations, bulk metallic glass composite alloys may include between: 1 vol. % and 50 vol. % Mo; 1 vol. % and 25 vol. % Mo; 25 vol. % and 50 vol. % Mo; 1 vol. % and 10 vol. % Mo; 10 vol. % and 20 vol. % Mo; 20 vol. % and 30 vol. % Mo; 30 vol. % and 40 vol. % Mo; 40 vol. % and 50 vol. % Mo; 1 vol. % and 5 vol. % Mo; 5 vol. % and 10 vol. % Mo; 10 vol. % and 15 vol. % Mo; 15 vol. % and 20 vol. % Mo; 20 vol. % and 25 vol. % Mo; 25 vol. % and 30 vol. % Mo; 30 vol. % and 35 vol. % Mo; 35 vol. % and 40 vol. % Mo; 40 vol. % and 45 vol. % Mo; or 45 vol. % and 50 vol. % Mo.

D. Example Phase and Nanostructure Characteristics

Exemplary alloys can have various phase and nanostructure characteristics in powder form and after being subjected to an additive manufacturing process (also referred to as "as-built"). Typically, exemplary alloys have a majority crystal structure that is amorphous.

Exemplary alloys may have a Poisson ratio, v, of between 0.30 and 0.40. In various instances, exemplary alloys have a Poisson ratio, v, of between 0.30 and 0.40; between 0.3 and 0.35; between 0.35 and 0.4; between 0.33 and 0.38; between 0.37 and 0.4; or 0.32 and 0.37. In various instances, exemplary alloys have a Poisson ratio, v, of no less than 0.35; no less than 0.37; or no less than 0.39. In various instances, exemplary alloys have a Poisson ratio, v, of no greater than 0.4; no greater than 0.38; or no greater than 0.36.

Exemplary alloys may have an elastic shear modulus, $\mu$, of between 39 GPa and 82 GPa. In various instances, exemplary alloys may have an elastic shear modulus, $\mu$, of between 39 GPa and 82 GPa; between 40 GPa and 60 GPa; between 60 GPa and 80 GPa; between 40 GPa and 50 GPa; between 45 GPa and 55 GPa; between 50 GPa and 60 GPa; or between 60 GPa and 70 GPa. In various implementations, exemplary alloys may have an elastic shear modulus, $\mu$, of no greater than 82 GPa; no greater than 70 GPa; no greater than 65 GPa; no greater than 60 GPa; no greater than 55 GPa; no greater than 50 GPa; or no greater than 45 GPa. In various implementations, exemplary alloys may have an elastic shear modulus, $\mu$, of no less than 40 GPa; no less than 45 GPa; no less than 50 GPa; no less than 55 GPa; no less than 60 GPa; or no less than 65 GPa.

Exemplary alloys may have a calculated liquidus temperature of between 950° C. and 1450° C. In various implementations, exemplary alloys may have a liquidus temperature of between 950° C. and 1450° C.; between 1000° C. and 1450° C.; between 1100° C. and 1350° C.; between 1200° C. and 1450° C.; between 1000° C. and 1200° C.; between 1000° C. and 1100° C.; between 1100° C. and 1200° C.; between 1200° C. and 1300° C.; or between 1300° C. and 1400° C.

Exemplary alloys may have a glass transition temperature, $T_g$, of between 355° C. and 630° C. In various implementations, exemplary alloys may have a glass transition temperature, $T_g$, of between 355° C. and 630° C.; between 375° C. and 525° C.; between 425° C. and 575° C.; between 360° C. and 460° C.; between 450° C. and 630° C.; between 375° C. and 475° C.; between 475° C. and 575° C.; and between 400° C. and 475° C.

In some instances, alloys disclosed and contemplated herein are aged at a condition leading to crystallization of a secondary crystalline phase contained within an amorphous matrix that has a large mismatch in modulus but a small mismatch in the coefficient of thermal expansion.

Generally, exemplary alloys have a reduced glass transition temperature, $T_{rg}$, that is between 0.47 and 0.59. As used herein, $T_{rg}$ is defined as $T_g/T_l$, with $T_g$ obtained from a model and $T_l$ obtained from thermodynamic calculations (e.g., with Thermo-Calc). In various implementations, exemplary alloys may have a reduced glass transition temperature, $T_{rg}$, that is between: 0.47 and 0.59; 0.50 to 0.57; 0.49 to 0.54;

0.50 to 0.55; or 0.52 to 0.58. In various implementations, exemplary alloys may have a reduced glass transition temperature, $T_{rg}$, that is no less than 0.47; no less than 0.50; no less than 0.51; no less than 0.525; no less than 0.53; or no less than 0.55.

Generally, example alloys may have a critical defect size, $a_c$, of between 1 μm and 300 μm. As used herein, $a_c$ is defined as $$\alpha_c = \frac{1}{\pi}\left(\frac{K_{IC}}{\sigma\gamma}\right)^2,$$

where $K_{1C}$ is fracture toughness and σy is yield stress. In various implementations, exemplary alloys may have a critical defect size $a_c$, of between 2 μm and 300 μm; between 10 μm and 300 μm; between 10 μm and 80 μm; between 100 μm and 300 μm; between 135 μm and 300 μm; between 100 μm and 200 μm; between 150 μm and 250 μm; or between 200 μm and 300 μm. In various implementations, exemplary alloys may have a critical defect size $a_c$, of no less than 100 μm; no less than 125 μm; no less than 150 μm; no less than 180 μm; no less than 200 μm; no less than 225 μm; or no less than 250 μm.

In some instances, alloys disclosed and contemplated herein have particle spacing that is smaller than a critical flaw size.

E. Example Physical Properties

Exemplary alloys can have various physical properties in powder form and after being subjected to an additive manufacturing process (also referred to as "as-built"). Exemplary bulk metallic glass alloys, after being subjected to an additive manufacturing process, typically have a primarily amorphous phase and, in some instances, may also include a crystalline phase. In some instances, alloys disclosed and contemplated herein are substantially free of crystallized phases after solidification.

Exemplary bulk metallic glass composite alloys, after being subjected to an additive manufacturing process, typically have a primarily amorphous phase and a metallic phase and, in some instances, may also include a crystalline phase. The presence of the amorphous phase and the metallic phase may be referred to as a "dual phase system."

An additional, second phase can provide improved alloy properties, such as ductility and crack tolerance. In some instances, alloys disclosed and contemplated herein have improved mechanical properties, and/or increased critical flaw size or increased crack tolerance.

In some instances, exemplary alloys subjected to additive manufacturing processes may be two-phase alloys (referred to elsewhere in this disclosure as bulk metallic glass composite alloys). The first phase may be bulk metallic glass and the second phase may be a crystalline metal phase, where the crystalline metal phase is comprised of one or more metals. As examples, exemplary bulk metallic glass composite alloys may have between 1 volume percent (vol. %) to 50 vol. % crystalline metal phase. In various implementations, exemplary alloys may have a crystalline metal phase that is: 1 vol. % to 50 vol. %; 5 vol. % to 45 vol. %; 5 vol. % to 40 vol. %; 10 vol. % to 40 vol. %; 10 vol. % to 30 vol. %; 20 vol. % to 40 vol. %; 30 vol. % to 50 vol. %; 5 vol. % to 15 vol. %; 15 vol. % to 25 vol. %; 25 vol. % to 35 vol. %; 35 vol. % to 45 vol. %; or 40 vol. % to 50 vol. %.

In some instances, the crystalline metal phase may be present as a thin metal network. Typically, thin metal network structures occur when copper (Cu) is used as a crystalline metal phase. Without being bound by a particular theory, it is thought that Fe—Cu phase separation may be important to avoiding mixing of the bulk metallic glass phase and the thin metal layers/network.

In some instances, the crystalline metal phase may be present as dispersed metal islands. As described above, exemplary bulk metallic glass composite alloys may be smaller with the particle spacing than the plastic zone. Generally, the mean particle spacing is a function of diameter and will decrease with increasing the volume percentage of the metallic phase. As more metal phase is added (by volume percentage), the smaller the spacing between the metal islands will become. Without being bound by a particular theory, it is thought that Fe—Cu phase separation to avoid mixing of the bulk metallic glass phase and the crystalline metal phase may be beneficial.

II. Example Methods of Preparing Alloy Powders

Example bulk metallic glass alloys and bulk metallic glass composite alloys disclosed and contemplated herein can be fabricated into various input stock forms relevant to the additive manufacturing system of interest. For instance, example steel alloys disclosed and contemplated herein can be manufactured into atomized alloy powder using available atomization techniques such as inert gas atomization. Resulting atomized alloy powders can be used in powder-bed fusion and directed energy deposition systems.

An example method of manufacturing an atomized alloy powder includes melting elemental metal feedstock or pre-alloyed feedstock such that a desired chemistry is produced. In some combinations of elements disclosed above, when a desired chemistry reaches temperatures at or above temperatures where there is no solid material fraction in the melt, atomization processes should take place.

Certain exemplary bulk metallic glass composite alloy powders that include copper (Cu) may have copper nanoparticles on an exterior surface of the powder. Copper nanoparticles can be applied to an exterior surface of the powder using known techniques, such as coating or freeze granulating copper nanoparticles.

Exemplary bulk metallic glass composite alloys may be generated using an alloy powder mixture, where a desired amount or fraction of the total alloy particles are exemplary bulk metallic glass alloy particles and the remaining fraction are pure metal alloy particles. Prior to use in additive manufacturing, mechanical mixing may be used to evenly distribute the different types of particles in the powder.

Example atomized alloy powders can have particles sized for a particular use and/or fabrication system. In some implementations, example atomized alloy powders include particles having diameters of from 20 μm to 63 μm.

III. Example Methods of Additive Manufacturing

Example alloys disclosed and contemplated herein can be used in additive manufacturing systems. Generally, various physical properties and phase and nanostructure characteristics discussed herein can be generated via various processing parameter optimization. For instance, $T_{rg}$, critical cooling rate, and casting thickness may all be related and can be correlated via experimental results and known physical properties.

Additive manufacturing is a process by which parts are built in a layered fashion by selectively fusing metal using a computer-controlled energy source (e.g., laser, electron beam, weld torch, or the like). Additive manufacturing is also defined in ASTM F2792-12a entitled "Standard Terminology for Additively Manufacturing Technologies."

Example additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; and directed energy deposition. In general, additive manufacturing techniques provide flexibility in free-form fabrication without geometric constraints, fast material processing time, and innovative joining techniques. Suitable additive manufacturing systems include the EOSINT M 280 Direct Metal Laser Sintering (DMLS) additive manufacturing system, available from EOS GmbH (Robert-Stirling-Ring 1, 82152 Krailling/Munich, Germany).

In some implementations, direct metal laser sintering (DMLS) is used to produce articles comprising the disclosed and contemplated example alloys. During example processes, an atomized alloy powder may be spread in a bed and a laser is used to selectively melt and fuse regions of the bed. Articles of manufacture can be built in a layer-by-layer fashion by continually spreading and fusing layers of powder.

In implementations utilizing DMLS, laser settings can be selected to, for a manufactured article, minimize porosity, maximize elongation and reduction in area (RA %), and provide proper strength characteristics. Example DMLS laser parameters in one possible implementation include: laser power of 370 W, scan speed of 1300 mm/s, scan spacing 0.17 mm, and layer depth 30 μm.

Various post-processing operations can be performed after the build process. For a high degree of amorphousness, the article should be cooled at a rate higher than the critical cooling rate $R_c$. Correlations between $R_c$ to the reduced glass transition temperature $T_{rg}$ may be found in Jafary-Zadeh, Mehdi, et al. "A Critical Review on Metallic Glasses as Structural Materials for Cardiovascular Stent Applications," J. of Functional Biomaterials, 2018, 9, 19. Exemplary bulk metallic glass alloys and bulk metallic glass composite alloys are designed to have sufficiently high $T_{rg}$, hence sufficiently low $R_c$, so that common cooling rates in additive manufacturing are sufficiently high to obtain a largely amorphous alloy.

IV. Computational and Experimental Examples

Various computational and experimental examples were evaluated and the results are discussed below.

A. Variation of Metal Composite Components

Varying amounts of different metal phase components were tested with a bulk metallic glass alloy, and certain properties were computationally determined. In particular, the starting bulk metallic glass alloy included 62.95 at % Fe, 13.25 at % P, 4.6 at % Zr, and 19.5% Ni.

Figure 3:
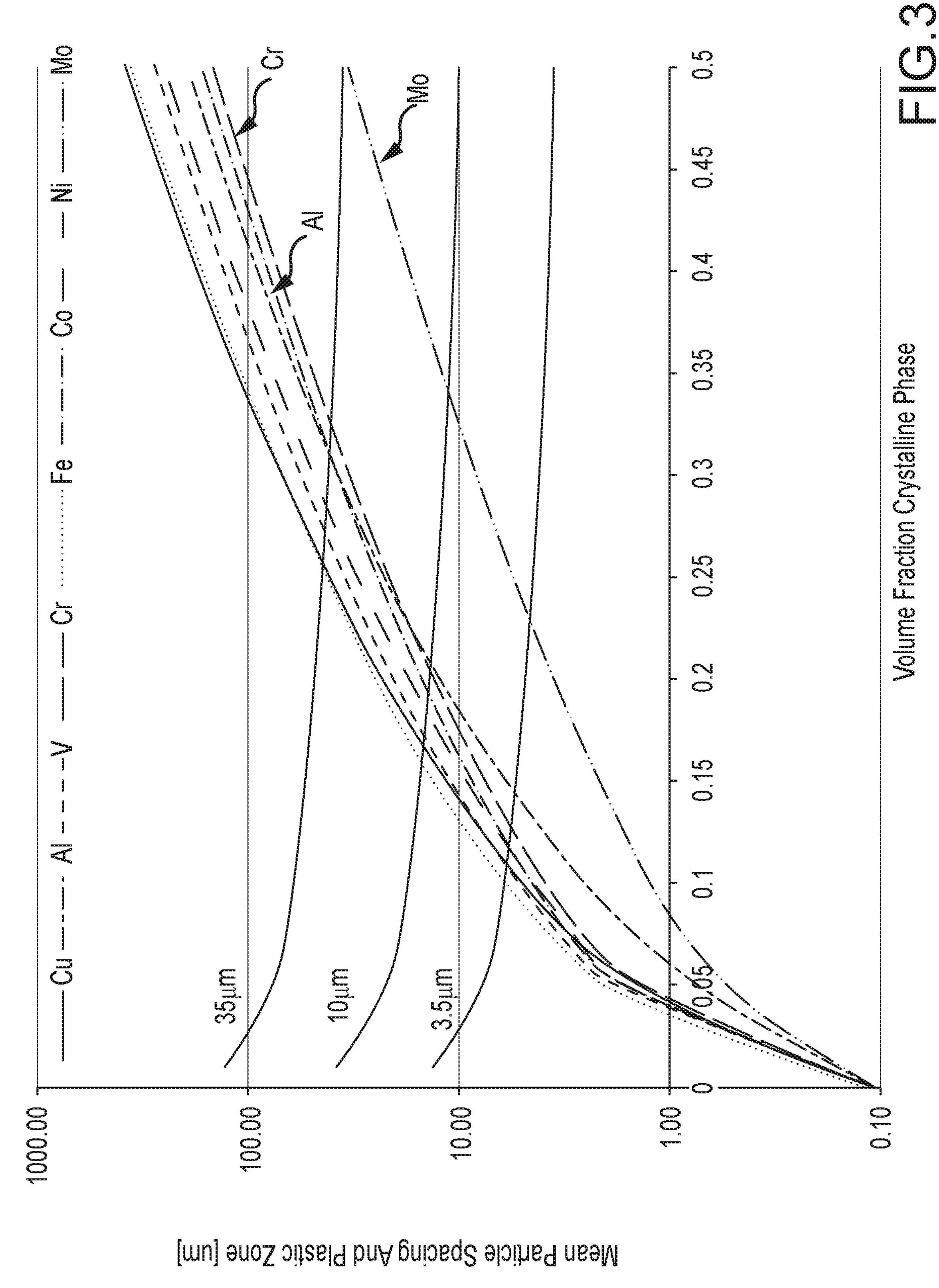
FIG. 3 shows a graph of mean particle spacing and plastic zone as the volume fraction crystalline phase varies for different metal elements.

FIG. 3 shows a graph of mean particle spacing and plastic zone as the volume fraction crystalline phase varies for different metal elements from 0 volume fraction to 0.5 volume fraction. The mean particle spacing in FIG. 3 is shown in black lines (35 μm for the top line, 10 μm for the middle line, and 3.5 μm for the bottom line). For the data shown in FIG. 3, copper (Cu), aluminum (Al), vanadium (V), chromium (Cr), iron (Fe), cobalt (Co), nickel (Ni), and molybdenum (Mo), were all computationally evaluated. Without being bound by a particular theory, it appears that introduction of a ductile, crystalline metal phase provides enhanced energy absorption to the composite alloy. Without being bound by a particular theory, it appears that increasing volume fraction of the metal phase leads to increased ductility, which supports the concept of matching particle spacing and plastic zone.

B. Variation of Copper Content

Figure 4:
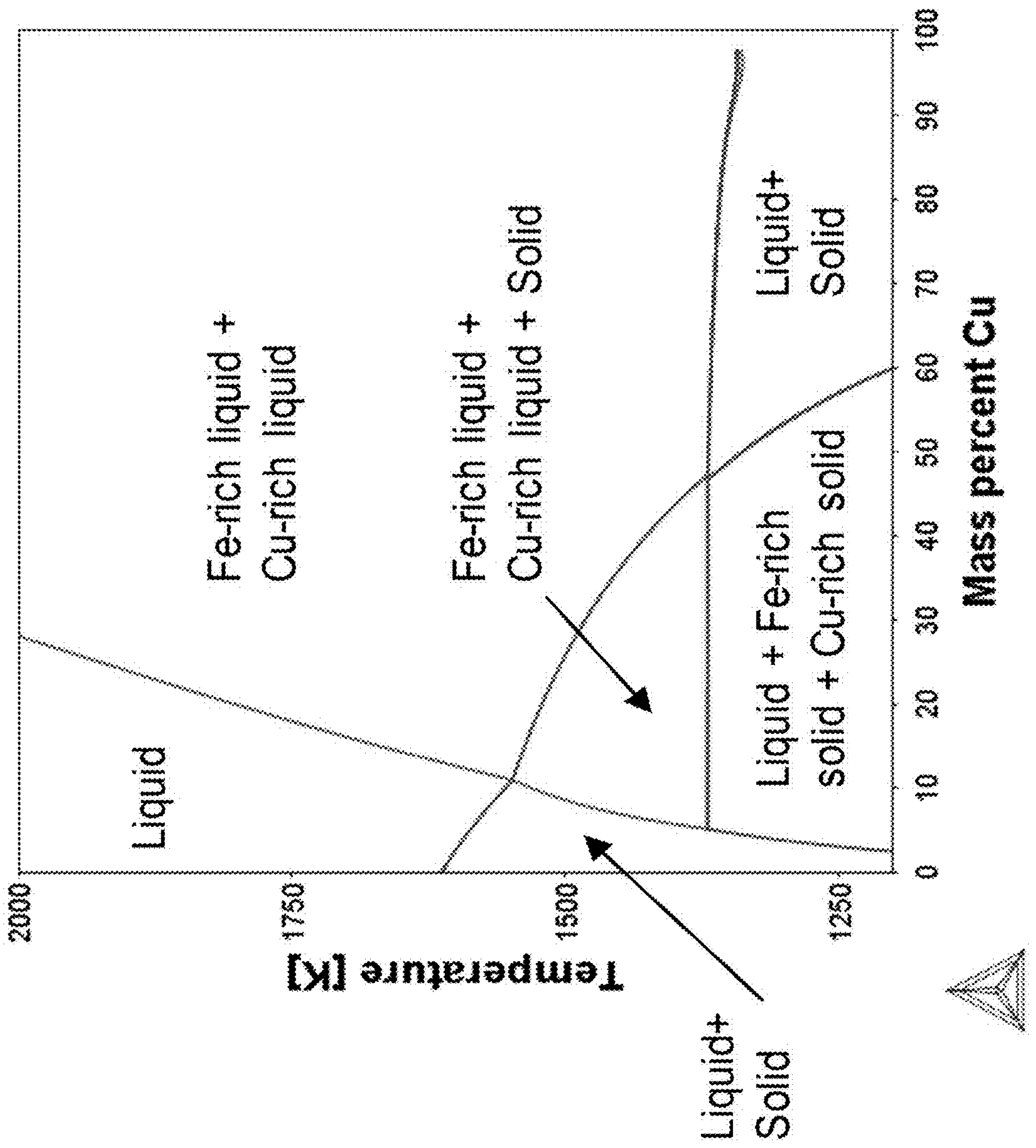
FIG. 4 shows a phase diagram for an iron-based bulk metallic glass including 1.2 weight percent boron and carbon, with varying amounts of copper.

Various amounts of copper were computationally evaluated to determine phases in a bulk metallic glass. The bulk metallic glass was iron-based and included 1.2 weight percent (wt %) boron (B) and carbon (C). FIG. 4 shows the resulting phase diagram.

Certain design considerations include the dispersion of the crystalline metal phase and reactivity of the bulk metallic glass phase with the crystalline metal phase. As indicated in FIG. 4, copper appears to form a miscibility gap with the bulk metallic glass phase, which should improve the dispersion, keep metal phase islands similar to the powder size, and minimize mixing with the bulk metallic glass phase. Liquid phase separation may be controlled by alloying (with Cu, B, C, and/or P) to minimize mixing between the bulk metallic glass phase and crystalline metal addition for microstructure control.

Figures 5A, 5B:
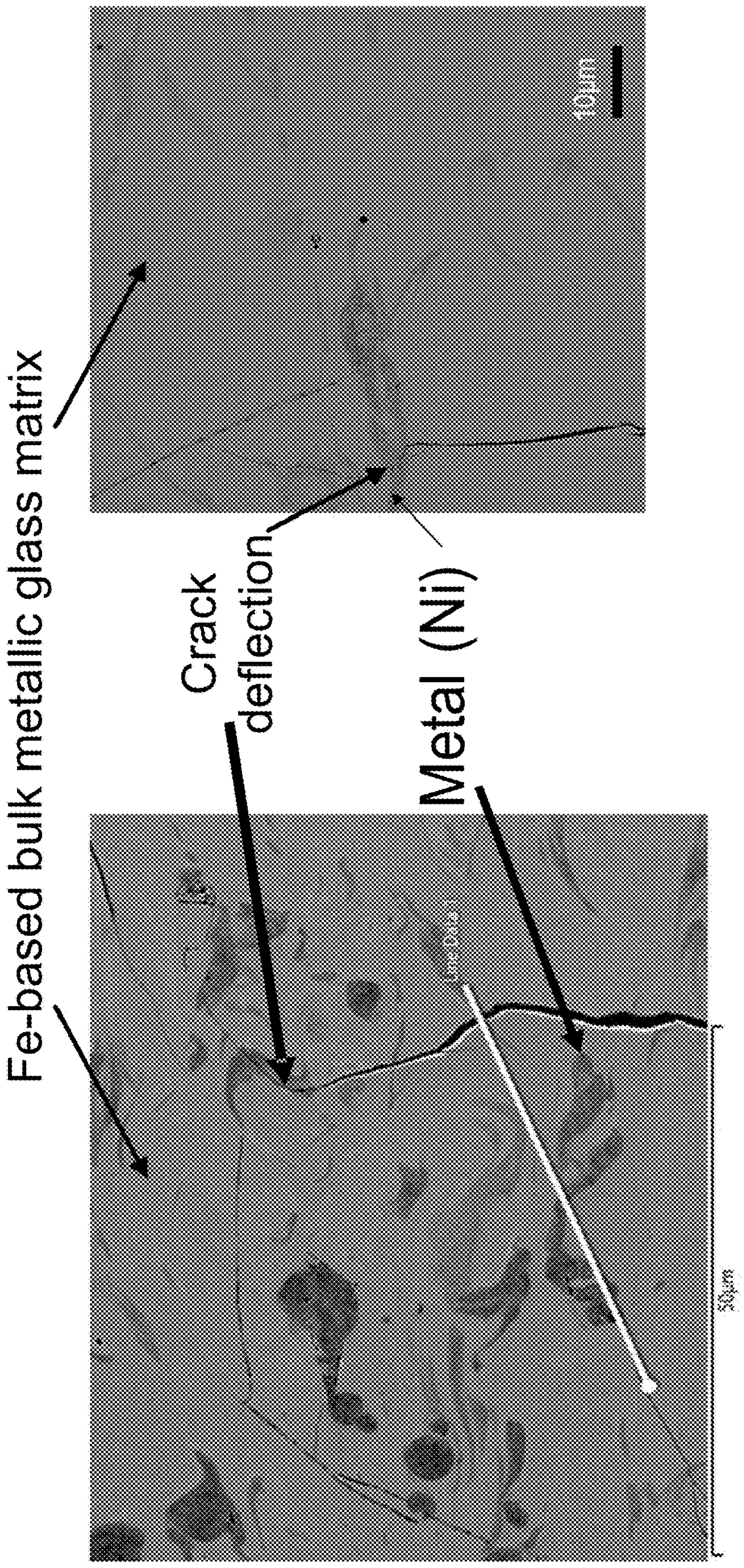
FIG. 5A and FIG. 5B are scanning electron micrographs, at different magnifications, obtained for an experimentally produced alloy.

Scanning electron micrographs were obtained for an experimental example alloy and are shown as FIG. 5A and FIG. 5B. Other elements, such as nickel (Ni), were observed as partly remaining as metal islands but form a gradient zone with the original bulk metallic glass phase. Accordingly, the bulk metallic glass alloy could be selected to account for this behavior.

C. Relationship of Printability and Glass Formability

Figure 6:
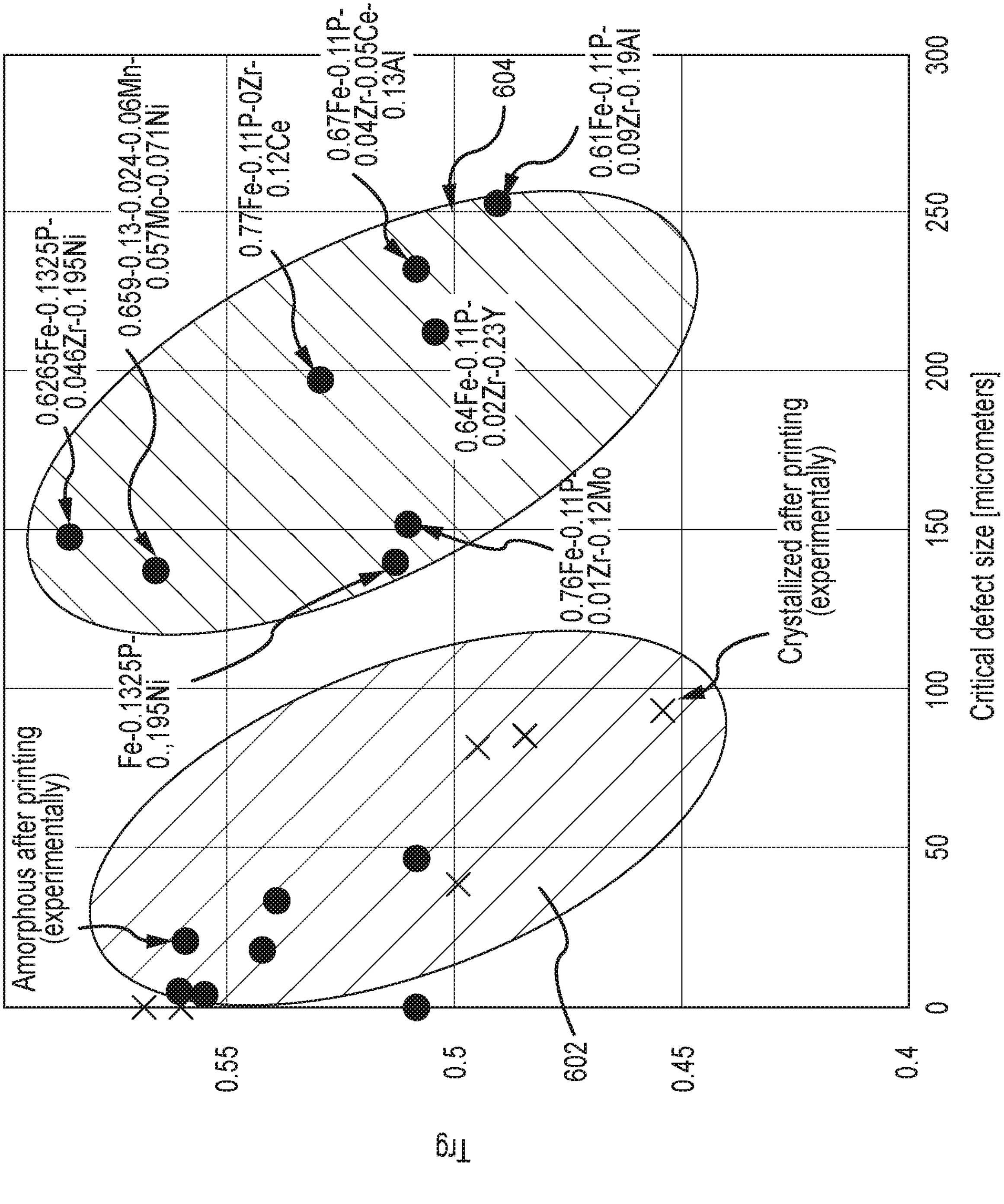
FIG. 6 is a chart showing glass formation ability and critical defect size for various literature alloys and exemplary alloys.

Glass formation ability (GFA) was plotted against critical defect size, $a_c$, for various literature alloys and exemplary alloys, and the results are shown in FIG. 6. As discussed above, reduced glass transition temperature, $T_{rg}$, is defined as $T_g/T_l$, with $T_g$ obtained from a model and $T_l$ obtained from thermodynamic calculations (e.g., with Thermo-Calc). As discussed above, $a_c$ is defined as $$a_c = \frac{1}{\pi}\left(\frac{K_{IC}}{\sigma_Y}\right)^2,$$

where $K_{1C}$ is fracture toughness and $\sigma_Y$ is yield stress.

In FIG. 6, region 602 is the space demonstrated by literature alloys. Table 1 below lists the literature alloys and various properties.

TABLE 1

Compositions and properties of various alloys found in literature, shown in region 602 in FIG. 6.

| Composition components (by atomic fraction) | Liquidus temperature, $T_l$ [° C.] | Critical defect tolerance, $\alpha_c$ (μm) | Fracture Energy, G [GPa] | Poisson's Ratio, ν | Tg [° C.] | Trg |
|---|---|---|---|---|---|---|
| 0.71Fe—0.10Si—0.11B—0.06C—0.02Cr | 1200.33 | 0.030 | 70.7 | 0.313 | 565.7 | 0.57 |
| 0.437Fe—0.073Co—0.147Cr—0.126Mo—0.155C—0.043B—0.019Y | 1315.67 | 5.0 | 79.9 | 0.317 | 617.2 | 0.56 |
| 0.58Fe—0.15Cr—0.02Mn—0.01B—0.04C—0.02Mo—0.01Si—0.01W—0.01Zr | 1375.61 | 81.5 | 66.8 | 0.359 | 542.4 | 0.49 |
| 0.35Fe—0.25Cr—0.15Mo—0.1W—0.03C—0.05Mn—0.02Si—0.05B | 1530.91 | 39.3 | 81.6 | 0.337 | 626.4 | 0.50 |
| 0.74Fe—0.04Mo—0.1P—0.075C—0.025B—0.02Si | 1332.45 | 85.7 | 60.6 | 0.346 | 504.7 | 0.48 |
| 0.683Fe—0.069C—0.025Si—0.067B—0.087P—0.023Cr—0.025Mo—0.021Al | 1301.45 | 47.5 | 64.2 | 0.330 | 526.8 | 0.51 |
| 0.49Fe—0.18Cr—0.15B—0.074Mo—0.024Si—0.0382C—0.016W | 1495.77 | 0.806 | 81.5 | 0.315 | 625.9 | 0.51 |

In FIG. 6, region 604 is space demonstrated by various experimentally tested and designed (but not experimentally tested) alloys. Table 2 below lists the exemplary allows and measured or calculated properties.

TABLE 2

Compositions and various properties of exemplary alloys shown in region 604 in FIG. 6. * indicates experimentally tested

| Composition components (by atomic fraction) | Liquidus temperature, $T_l$ [° C.] | Critical defect tolerance, $\alpha_c$ (μm) | Fracture Energy, G [GPa] | Poisson's Ratio, ν | Tg [° C.] | Trg |
|---|---|---|---|---|---|---|
| 0.77Fe—0.11P—0Zr—0.12Ce | 1001 | 196 | 45.2 | 0.377 | 401 | 0.53 |
| 0.61Fe—0.11P—0.09Zr—0.19Al* | 1014* | 252 | 39.5* | 0.373* | 358* | 0.49 |
| 0.76Fe—0.11P—0.01Zr—0.12Mo | 1136 | 151 | 51.6 | 0.380 | 446 | 0.51 |
| 0.659—0.13—0.024—0.06Mn—0.057Mo—0.071Ni* | 1012* | 136 | 53* | 0.370* | 455* | 0.57 |
| 0.64Fe—0.11P—0.02Zr—0.23Y | 1029 | 212 | 42.8 | 0.370 | 383 | 0.50 |
| 0.67Fe—0.11P—0.04Zr—0.05Ce—0.13Al | 995 | 232 | 41.3 | 0.375 | 372 | 0.51 |
| 0.6265Fe—0.1325P—0.043Zr—0.195Ni* | 958* | 147 | 51.8* | 0.374* | 447* | 0.59 |
| 0.6725Fe—0.1325P—0.195Ni | 1148 | 140 | 5.32E+01 | 0.375 | 457 | 0.51 |

Figure 7:
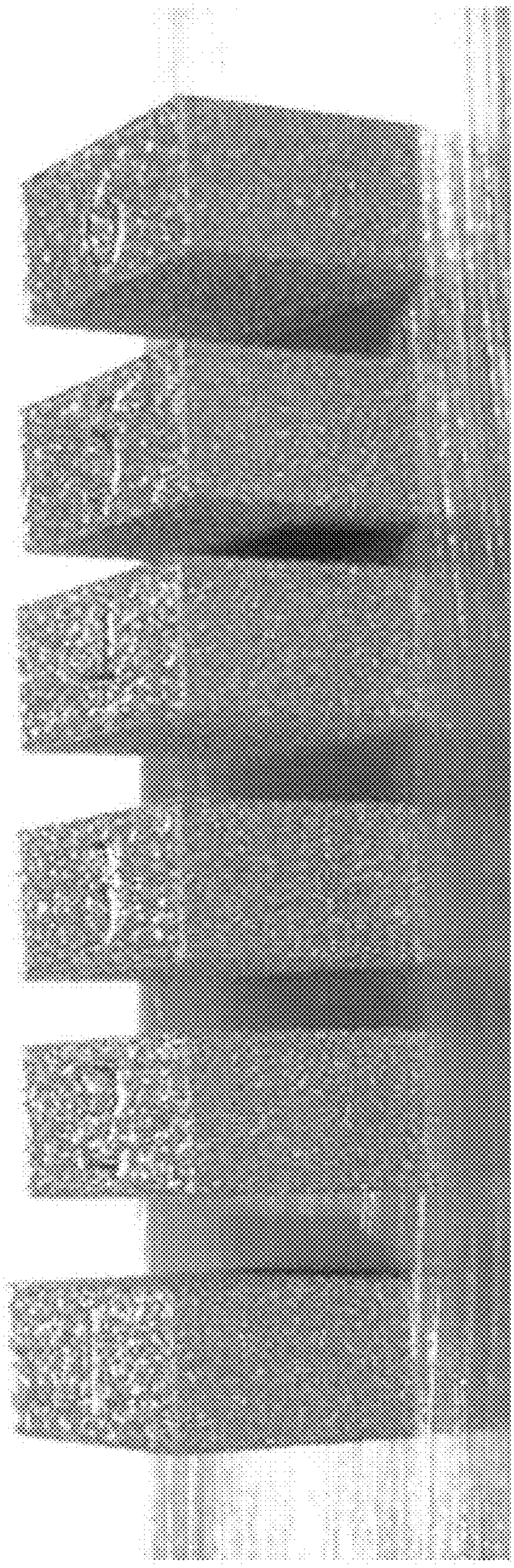
FIG. 7 is a photograph of an experimentally-produced exemplary alloy included in FIG. 6.
Figure 8:
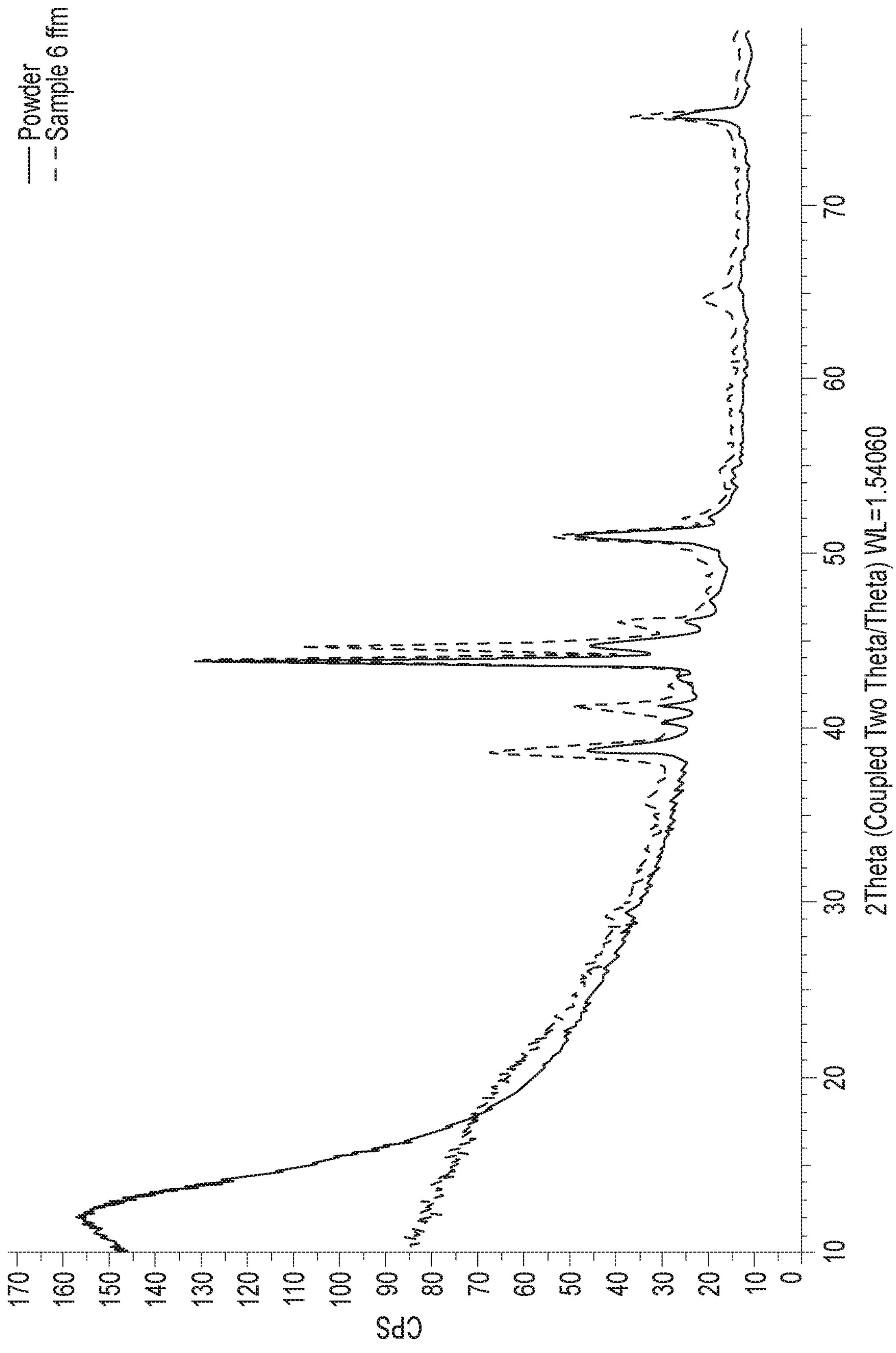
FIG. 8 is an x-ray powder diffraction (XRD) plot for the experimental alloy shown in FIG. 7.

One experimental example alloy shown in FIG. 6 included 62.65 at % Fe, 13.25 at % P, 4.3 at % Zr, and 19.5 at % Ni. A photograph of the experimental example alloy is shown in FIG. 7. It was observed that the experimental alloy showed large builds were possible but microcracks remained, there was low amorphous content, and high oxygen pick-up, which may have been a source for crystal nucleation. FIG. 8 is an x-ray powder diffraction (XRD) plot for the experimental alloy shown in FIG. 7.

Figure 9:
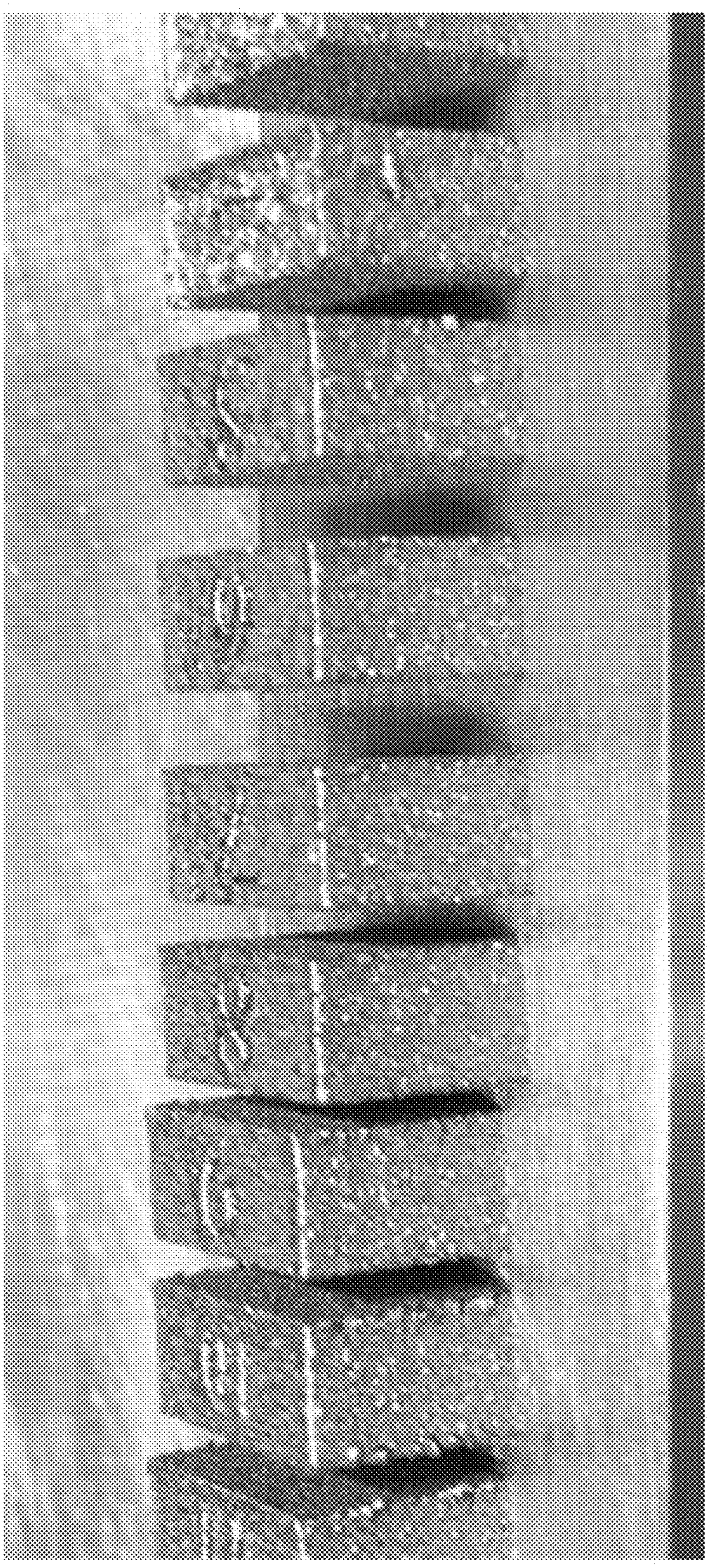
FIG. 9 is a photograph of another experimentally-produced exemplary alloy included in FIG. 6.
Figure 10:
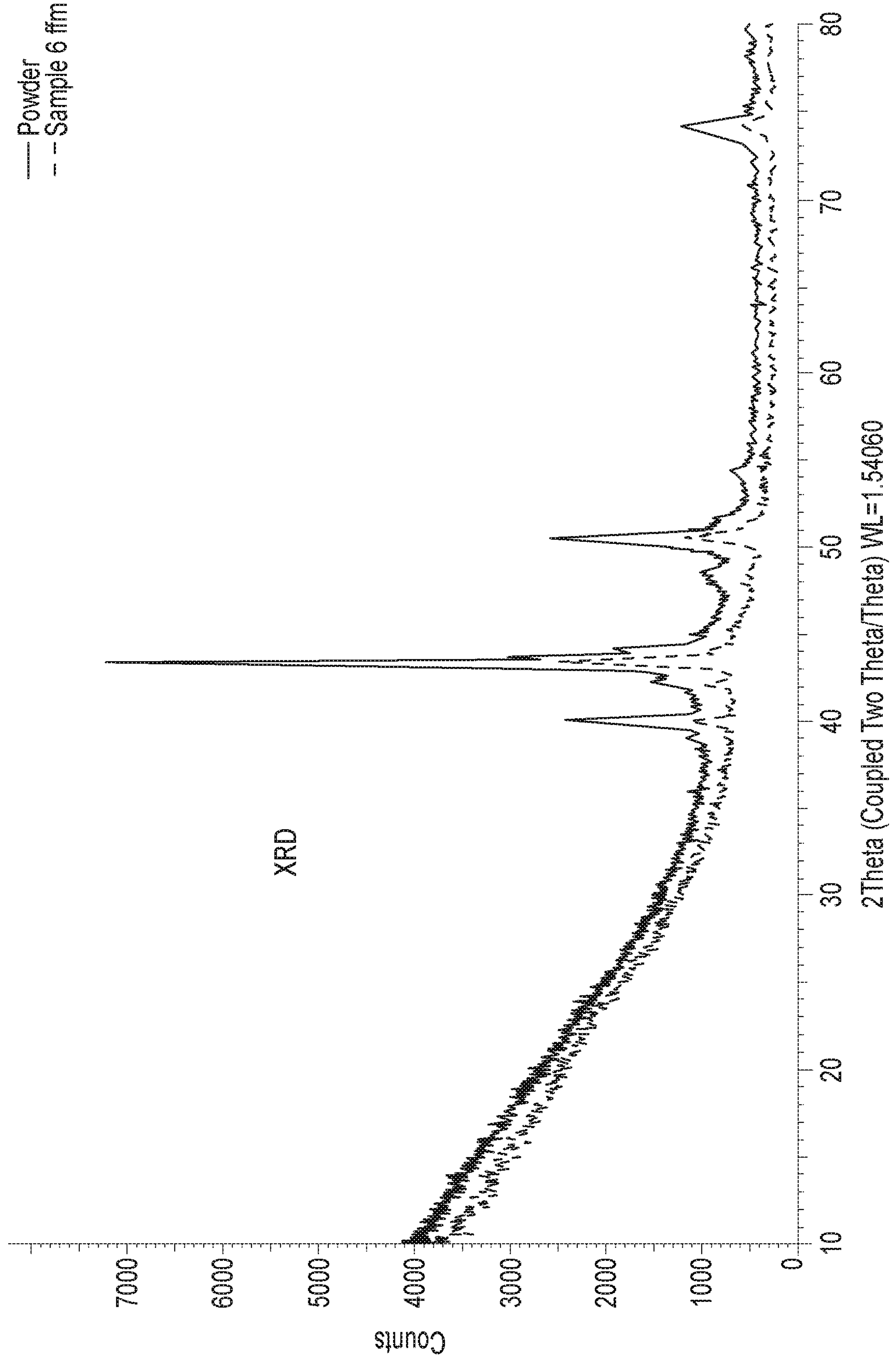
FIG. 10 is an x-ray powder diffraction (XRD) plot for the experimental alloy shown in FIG. 9.

Another experimental example alloy shown in FIG. 6 included 65.9 at % Fe, 13 at % P, 6 at % Mn, 5.7 at % Mo, and 7.1 at % Ni. A photograph of the experimental example alloy is shown in FIG. 9. The experimental alloy shown in FIG. 9 showed that large builds are possible but microcracks remain, there was no or low amorphous content, and there was less oxygen pick up in the experimental alloy shown in FIG. 9 than the alloy shown in FIG. 7. FIG. 10 is an x-ray powder diffraction (XRD) plot for the experimental alloy shown in FIG. 9.

D. Effects on $T_{rg}$ and $a_{crit}$

Varying amounts of different glass forming components were tested with a reference alloy including 13.25 at % phosphorous, 19.5 at % nickel, and the balance iron, to evaluate effects of the elements on $T_{rg}$ and $a_{crit}$. Results are shown in FIG. 11.

Figure 11:
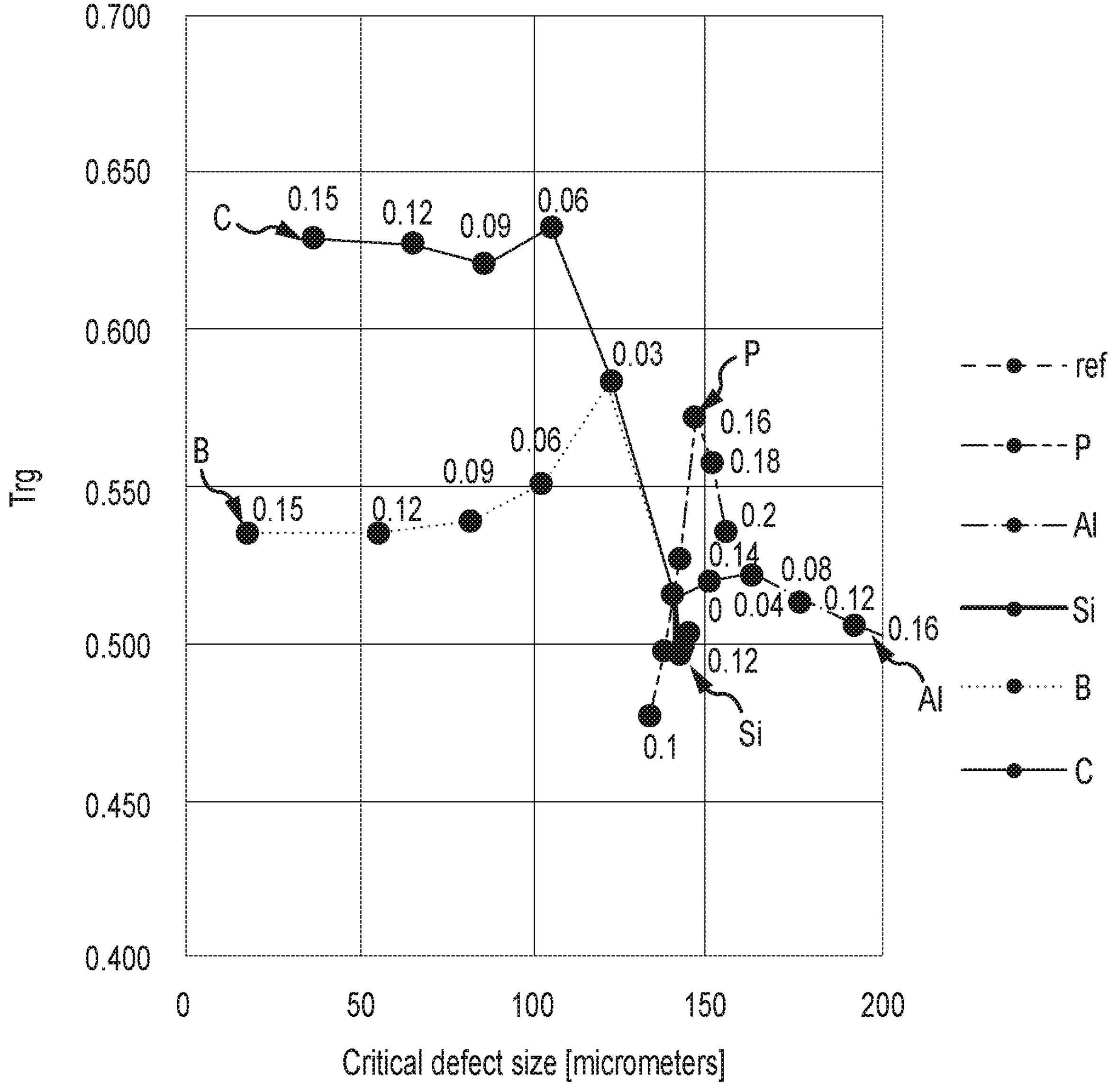
FIG. 11 is chart showing reduced glass transition temperature, $T_{rg}$, and critical defect size, $a_c$, for alloys with various amounts of different glass forming components.

From FIG. 11, it appears that carbon (C) and boron (B) are detrimental to the critical defect size tolerance but beneficial for the vitrification (glass formability), possibly because of the formation of less-metallic (i.e., brittle) molecular associates. It also appears from FIG. 11 that the alloying direction with phosphorous (P) is largely positive for glass formability (because of formation of molecular associates). It also appears that P is positive for the critical defect size tolerance, possibly because of phosphorous' metallic bonding nature. From FIG. 11, aluminium (Al) has been identified as one of the elements with the strongest positive effect on the critical defect tolerance.

E. Oxygen Gettering

Figure 12:
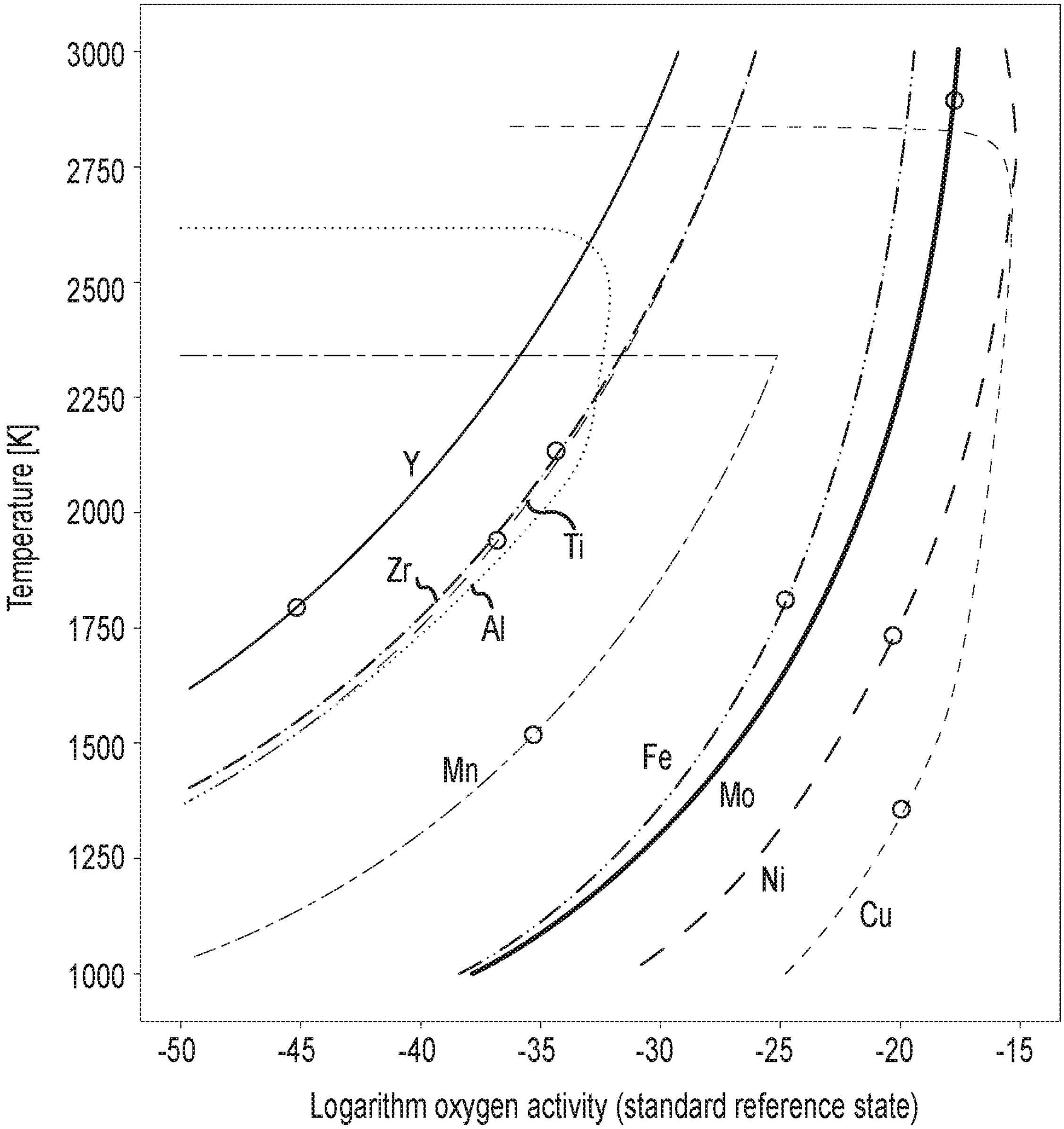
FIG. 12 shows a plot of temperature versus logarithmic oxygen activity for various elements.

Various elements were compared to identify possible elements to getter oxygen to allow other, less reactive elements (such as Zr, Ti, and Al) in the design space. FIG. 12 shows a plot of temperature versus logarithmic oxygen activity. As shown in FIG. 12, yttrium (Y) can be used to getter oxygen (which may be unavoidable from the additive manufacturing process) and alloy to utilize less reactive elements for the design. In some instances, it may be beneficial to use element pairs with soft associates such as Al—Y.

F. Exemplary Bulk Metallic Glass Alloy Compositions

Various exemplary bulk metallic glass alloy compositions were identified and evaluated. In particular, Table 3 below shows various allow powder compositions for additive manufacturing-processable bulk metallic glass alloys, along with calculated features. These compositions and their properties were modeled using proprietary software. Each bulk metallic glass alloy composition listed in the table below can be used with one or more metal phases (discussed above) in bulk metallic composite alloys.

TABLE 3

Example alloy powders and various calculated properties after additive manufacturing.

| Alloy components (atomic fraction) | Liquidus temperature, $T_l$ [° C.] | Critical defect tolerance, $\alpha_c$ [m] | Fracture Energy, G [GPa] | Poisson's Ratio, ν | Glass transition temperature $T_g$ [° C.] |
|---|---|---|---|---|---|
| 0.77Fe—0.11P—0.12Ce | 1001 | 0.000196 | 45.2 | 0.377 | 401 |
| 0.61Fe—0.11P—0.09Zr—0.19A1 | 1014 | 0.000252 | 39.5 | 0.373 | 358 |
| 0.76Fe—0.11P—0.01Zr—0.12Mo | 1136 | 0.000151 | 51.6 | 0.38 | 446 |
| 0.64Fe—0.11P—0.02Zr—0.23Y | 1029 | 0.000212 | 42.8 | 0.37 | 383 |
| 0.67Fe—0.11P—0.04Zr—0.05Ce—0.13Al | 995 | 0.000232 | 41.3 | 0.375 | 372 |
| 0.49Fe—0.24Cr—0.09Mo—0.10C—0.08B | 1387 | 0.000018 | 81.7 | 0.324 | 627 |
| 0.63Fe—0.06Cr—0.14Mo—0.12C—0.06B | 1326 | 0.000034 | 74.7 | 0.329 | 589 |
| 0.64Fe—0.14Mo—0.15C—0.07B | 1292 | 0.000004 | 75.9 | 0.317 | 595 |
| 0.50Fe—0.30Ni—0.13P—0.07C | 1442 | 0.000093 | 60.6 | 0.352 | 505 |
| 0.73Fe—0.11Si—0.11B—0.03C—0.02Cr | 1199 | 0.000021 | 68 | 0.322 | 550 |
| 0.48575Fe—0.33P—0.08375Ni—0.1005Zr | 1202 | | 40.41 | 0.37 | 365 |
| 0.58725Fe—0.19P—0.10125Ni—0.1215Zr | 1182 | | 45.98 | 0.373 | 406 |
| 0.7Fe—0.2P—0.04Ni—0.06Zr | 1148 | | 46.62 | 0.375 | 411 |
| 0.55125Fe—0.37P—0.0315Ni—0.04725Zr | 1212 | | 39.63 | 0.369 | 358 |
| 0.6295Fe—0.1325P—0.195Ni—0.043Zr | 953 | | 51.9 | 0.374 | 448 |
| 0.435Fe—0.4P—0.135Ni—0.03Zr | 1189 | | 40.12 | 0.367 | 362 |
| 0.50Fe—0.1P—0.27Ni—0.13Zr | 1010 | | 51.4 | 0.373 | 444 |
| 0.352Fe—0.36P—0.192Ni—0.096Zr | 1191 | | 40.59 | 0.366 | 366 |

TABLE 3-continued

Example alloy powders and various calculated properties after additive manufacturing.

| Alloy components (atomic fraction) | Liquidus temperature, $T_l$ [° C.] | Critical defect tolerance, $\alpha_c$ [m] | Fracture Energy, G [GPa] | Poisson's Ratio, ν | Glass transition temperature $T_g$ [° C.] |
|---|---|---|---|---|---|
| 0.6725Fe—0.1325P—0.195Ni | 1421 | 0.00014 | 53.2 | 0.375 | 730 |
| 0.49Fe—0.17P—0.01C—0.13Cu—0.2Ni | 1181 | 0.000152 | 50.4 | 0.369 | 711 |
| 0.51Fe—0.16P—0.01C—0.12Cu—0.2Ni | 1161 | 0.000149 | 51 | 0.37 | 715 |
| 0.53Fe—0.15P—0.01C—0.11Cu—0.2Ni | 1136 | 0.000146 | 51.6 | 0.37 | 719 |
| 0.53Fe—0.14P—0.01C—0.12Cu—0.2Ni | 1157 | 0.000145 | 51.9 | 0.37 | 721 |
| 0.53Fe—0.13P—0.01C—0.13Cu—0.2Ni | 1191 | 0.000143 | 52.1 | 0.37 | 723 |
| 0.55Fe—0.12P—0.01B—0.01C—0.11Cu—0.2Ni | 1206 | 0.000133 | 53.8 | 0.368 | 734 |
| 0.56Fe—0.11P—0.02B—0.01C—0.1Cu—0.2Ni | 1244 | 0.000124 | 55.3 | 0.365 | 744 |
| 0.56Fe—0.1P—0.02B—0.01C—0.11Cu—0.2Ni | 1243 | 0.000123 | 55.6 | 0.365 | 745 |
| 0.56Fe—0.09P—0.03B—0.01C—0.11Cu—0.2Ni | 1270 | 0.000115 | 56.9 | 0.362 | 754 |
| 0.56Fe—0.08P—0.03B—0.01C—0.12Cu—0.2Ni | 1266 | 0.000114 | 57.2 | 0.362 | 756 |
| 0.51Fe—0.13P—0.02B—0.03C—0.11Mn—0.2Ni | 1187 | 0.000106 | 56 | 0.35 | 748 |
| 0.54Fe—0.13P—0.01B—0.04C—0.03Mn—0.2Ni—0.05A1 | 1223 | 0.000118 | 54.7 | 0.355 | 740 |
| 0.53Fe—0.13P—0.03C—0.01Mo—0.2Ni—0.1A1 | 1243 | 0.000144 | 50.9 | 0.363 | 714 |
| 0.5Fe—0.13P—0.01C—0.01Mo—0.2Ni—0.15Al | 1294 | 0.000177 | 46.7 | 0.368 | 684 |
| 0.633Fe—0.13P—0.071Mn—0.063Mo—0.103Ni | 1371 | 0.00015 | 51.1 | 0.373 | 715 |
| 0.627Fe—0.13P—0.006C—0.071Mn—0.063Mo—0.103Ni | 1347 | 0.000146 | 51.6 | 0.371 | 719 |
| 0.655Fe—0.13P—0.027C—0.06Mn—0.057Mo—0.071Ni | 1276 | 0.000134 | 53.2 | 0.365 | 730 |
| 0.617Fe—0.13P—0.08Mn—0.07Mo—0.103Ni | 1363 | 0.000151 | 51 | 0.372 | 715 |
| 0.61Fe—0.13P—0.09Mn—0.08Mo—0.09Ni | 1354 | 0.000153 | 50.7 | 0.372 | 712 |
| 0.669Fe—0.13P—0.07Mn—0.06Mo—0.071Ni | 1378 | 0.000153 | 50.7 | 0.373 | 713 |
| 0.649Fe—0.13P—0.02C—0.07Mn—0.06Mo—0.071Ni | 1297 | 0.000139 | 52.4 | 0.367 | 725 |
| 0.639Fe—0.13P—0.02C—0.08Mn—0.06Mo—0.071Ni | 1295 | 0.000139 | 52.3 | 0.366 | 723 |
| 0.61Fe—0.13P—0.02C—0.08Mn—0.08Mo—0.08Ni | 1347 | 0.000139 | 52.4 | 0.367 | 724 |
| 0.573Fe—0.13P—0.027C—0.09Mn—0.09Mo—0.09Ni | 1391 | 0.000134 | 53 | 0.364 | 728 |
| 0.58Fe—0.13P—0.02C—0.09Mn—0.09Mo—0.09Ni | 1379 | 0.000139 | 52.4 | 0.366 | 724 |
| 0.67Fe—0.13P—0.02C—0.06Mn—0.06Mo—0.06Ni | 1301 | 0.00014 | 52.5 | 0.368 | 725 |
| 0.658Fe—0.13P—0.024C—0.06Mn—0.057Mo—0.071Ni | 1285 | 0.000136 | 52.9 | 0.366 | 728 |
| 0.402Fe—0.168P—0.009C—0.014Cr—0.01Mo—0.393Ni—0.004A1 | 1190 | 0.000126 | 55.3 | 0.368 | 744 |
| 0.504Fe—0.169P—0.005C—0.016Cr—0.071Mn—0.019Mo—0.216Ni | 1201 | 0.000143 | 51.8 | 0.367 | 720 |
| 0.609Fe—0.165P—0.001B—0.005Cr—0.083Mn—0.004Mo—0.133Ni | 1231 | 0.000155 | 49.9 | 0.369 | 707 |

TABLE 3-continued

Example alloy powders and various calculated properties after additive manufacturing.

| Alloy components (atomic fraction) | Liquidus temperature, $T_l$ [° C.] | Critical defect tolerance, $\alpha_c$ [m] | Fracture Energy, G [GPa] | Poisson's Ratio, ν | Glass transition temperature $T_g$ [° C.] |
|---|---|---|---|---|---|
| 0.637Fe—0.149P—0.007Cr—0.016Mo—0.191Ni | 1320 | 0.000142 | 52.7 | 0.374 | 726 |
| 0.533Fe—0.182P—0.188Mn—0.005Mo—0.092Ni | 1246 | 0.000168 | 46.8 | 0.36 | 685 |
| 0.47Fe—0.119P—0.018C—0.024Cr—0.194Mn—0.066Mo—0.109Ni | 1315 | 0.000131 | 52.2 | 0.357 | 723 |
| 0.49Fe—0.129P—0.003B—0.015C—0.004Cr—0.008Mo—0.204Ni—0.147Al | 1267 | 0.000166 | 47.8 | 0.365 | 692 |
| 0.57Fe—0.13P—0.01C—0.03Mo—0.2Ni—0.06Al | 1319 | 0.000149 | 51.2 | 0.371 | 716 |
| 0.51Fe—0.14P—0.01C—0.01Mo—0.2Ni—0.13Al | 1270 | 0.000173 | 47.2 | 0.368 | 688 |
| 0.5Fe—0.13P—0.01B—0.01Mo—0.2Ni—0.15Al | 1375 | 0.000176 | 46.72 | 0.368 | 685 |
| 0.475Fe—0.13P—0.07Co—0.15Cr—0.14Mo—0.035Al | 1613 | 0.000124 | 56 | 0.371 | 749 |
| 0.475Fe—0.07P—0.06C—0.07Co—0.15Cr—0.14Mo—0.035Al | 1574 | 0.000087 | 64 | 0.359 | 798 |
| 0.475Fe—0.07P—0.06B—0.07Co—0.15Cr—0.14Mo—0.035Al | 1651 | 0.0000849 | 64 | 0.354 | 800 |
| 0.47Fe—0.13P—0.07Ce—0.15Cr—0.14Mo—0.035Al | 1512 | 0.00015 | 51.3 | 0.37 | 716 |
| 0.51Fe—0.13P—0.06B—0.08C—0.14Mo—0.08Al | 1674 | 0.000051 | 59 | 0.328 | 770 |
| 0.56Fe—0.13P—0.06B—0.07C—0.1Ni—0.08Al | 1360 | 0.0000438 | 59 | 0.326 | 771 |
| 0.54Fe—0.17P—0.07Mn—0.01Mo—0.21Ni | 1201 | 0.000151 | 50.6 | 0.369 | 712 |
| 0.52Fe—0.15P—0.01B—0.03C—0.12Mn—0.17Ni | 1162 | 0.000119 | 53.7 | 0.352 | 733 |
| 0.44Fe—0.13P—0.03B—0.01C—0.01Cr—0.38Ni | 1229 | 0.000103 | 59.5 | 0.359 | 771 |
| 0.53Fe—0.17P—0.19Mn—0.01Mo—0.1Ni | 1214 | 0.000164 | 47.4 | 0.361 | 689 |
| 0.6Fe—0.15P—0.02B—0.12Mn—0.01Mo—0.1Ni | 1222 | 0.00014 | 51.2 | 0.36 | 716 |
| 0.61Fe—0.13P—0.03B—0.01C—0.12Mn—0.1Ni | 1248 | 0.00012 | 53.8 | 0.353 | 733 |
| 0.64Fe—0.11P—0.05B—0.09Mn—0.01Mo—0.1Ni | 1299 | 0.00011 | 56.1 | 0.353 | 749 |
| 0.66Fe—0.09P—0.07B—0.01Co—0.06Mn—0.01Mo—0.1Ni | 1327 | 0.0000937 | 59.4 | 0.349 | 770 |
| 0.68Fe—0.07P—0.09B—0.03Co—0.02Mn—0.01Mo—0.1Ni | 1352 | 0.0000794 | 63 | 0.346 | 792 |

For the recitation of numeric ranges herein, each intervening number there between with the same degree of precision is contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are contemplated. For another example, when a pressure range is described as being between ambient pressure and another pressure, a pressure that is ambient pressure is expressly contemplated.

It is understood that the foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. An iron-based bulk metallic glass alloy comprising:

at least two first elements, the first element consisting of:

when present, between 1 at % to 3 at % or between 12 at % to 14 at % zirconium (Zr), when present, between 12 at % to 14 at % molybdenum (Mo), between 13 at % to 15 at % aluminum (Al), when present, between 1 at % to 10 at % yttrium (Y), when present, between 1 volumetric percent (vol. %) and 3 vol % or between 15 vol % and 16 vol % chromium (Cr), and when present, between 3 at % and 5 at % manganese (Mn), wherein the at least two first elements include aluminum;

between 7 at % and 9 at % phosphorous (P);

no more than three second elements, the second elements being selected from: when present, between 0.5 at % and 4 at % or between 5 at % and 9 at % carbon (C), when present, between 0.1 at % and 1 at % or between 7 at % to 9 at % boron (B), and when present, between 10 at % to 12 at % silicon (Si); and the balance iron (Fe), wherein a majority of a structure of the bulk metallic glass alloy is amorphous; and wherein the alloy has a critical defect size, $a_c$, of no less than 150 μm.

2. The alloy according to claim 1, wherein the alloy has a reduced glass transition temperature $T_{rg}$, defined as $T_g/T_l$, of between 0.47 and 0.59.

3. The alloy according to claim 1, wherein the alloy has an elastic shear modulus, μ, of between 39 GPa and 82 GPa.

4. The alloy according to claim 1, wherein the alloy has a liquidus temperature of from 950° C. to 1450° C.

5. The alloy according to claim 1, wherein the alloy has a glass transition temperature of from 355° C. to 630° C.

6. The alloy according to claim 1, wherein the at least two first elements include zirconium.

7. The alloy according to claim 1, wherein the at least two first elements include manganese and molybdenum.

8. The alloy according to claim 1, the at least two first elements comprising no more than 30 atomic % of the alloy.

9. The alloy according to claim 8, the second elements and phosphorous (P) comprising between 10 atomic % and 42 atomic % of the alloy.

10. The alloy according to claim 1, wherein between 1 volume percent (vol. %) and 50 vol. % of the structure of the bulk metallic glass alloy is a crystalline metal phase; and wherein the crystalline metal phase includes at least one of: copper (Cu), aluminum (Al), vanadium (V), chromium (Cr), iron (Fe), and molybdenum (Mo).

* * * * *